(12) United States Patent  
Wei et al.

(10) Patent No.: US 8,112,471 B2  
(45) Date of Patent: Feb. 7, 2012

(54) SYSTEM AND METHOD FOR WEBSITE PERFORMANCE OPTIMIZATION AND INTERNET TRAFFIC PROCESSING

(75) Inventors: Coach Wei, Cambridge, MA (US);  
Robert Buffone, Wakefield, MA (US);  
Raymond Stata, Dover, MA (US)

(73) Assignee: YOTTAA, Inc, Boston, MA (US)

( * ) Notice: Subject to any disclaimer, the term of this patent is extended or adjusted under 35 U.S.C. 154(b) by 0 days.

(21) Appl. No.: 12/961,680

(22) Filed: Dec. 7, 2010

(65) Prior Publication Data

US 2011/0137973 A1 Jun. 9, 2011

Related U.S. Application Data

(60) Provisional application No. 61/267,149, filed on Dec. 7, 2009.

(51) Int. Cl.  
*G06F 15/16* (2006.01)

(52) U.S. Cl. ........ 709/202; 709/217; 709/216; 709/248; 709/245; 709/213; 709/224; 709/241; 709/238; 709/227; 709/223; 726/22; 726/11; 726/13; 726/15; 726/26

(58) Field of Classification Search .................. 709/202, 709/224, 238, 247, 223, 226, 227  
See application file for complete search history.

(56) References Cited

U.S. PATENT DOCUMENTS

| | | | |
|---|---|---|---|
| 6,820,133 B1 | 11/2004 | Grove et al. | |
| 7,103,651 B2 * | 9/2006 | Bohannon et al. | 709/223 |
| 7,127,493 B1 | 10/2006 | Gautier | |
| 7,231,458 B2 * | 6/2007 | Tenereillo et al. | 709/241 |
| 7,366,793 B2 * | 4/2008 | Kenner et al. | 709/245 |
| 7,373,500 B2 * | 5/2008 | Ramelson et al. | 713/150 |
| 7,392,325 B2 | 6/2008 | Grove et al. | |
| 7,395,355 B2 | 7/2008 | Afergan et al. | |
| 7,562,153 B2 | 7/2009 | Biliris et al. | |
| 7,945,678 B1 * | 5/2011 | Skene | 709/227 |
| 2002/0087696 A1 | 7/2002 | Byrnes | |
| 2002/0124101 A1 | 9/2002 | Schaeck | |
| 2003/0014539 A1 | 1/2003 | Reznick | |
| 2003/0208600 A1 | 11/2003 | Cousins | |
| 2003/0225873 A1 | 12/2003 | Wade | |
| 2009/0300162 A1 * | 12/2009 | Demarie et al. | 709/224 |
| 2010/0325287 A1 * | 12/2010 | Jagadeeswaran et al. | 709/227 |

* cited by examiner

*Primary Examiner* — Jude Jean Gilles  
(74) *Attorney, Agent, or Firm* — AKC Patents LLC; Aliki K. Collins

(57) ABSTRACT

A system for optimizing the performance of a website that runs on one or more HTTP servers and is configured to receive HTTP requests from one or more clients via user agents and provide HTTP responses to the one or more clients includes an intermediary component configured to connect to the clients and the servers via network connections. The intermediary component includes a traffic management system (TMS) that includes means for managing HTTP requests originating from the clients and targeting the servers and HTTP responses originating from the servers and targeting the clients and means for redirecting the HTTP requests to the intermediary component. The intermediary component further includes a traffic processing system that includes means for receiving the redirected HTTP requests and the HTTP responses and means for applying optimization techniques to the redirected HTTP requests and the HTTP responses.

100 Claims, 23 Drawing Sheets

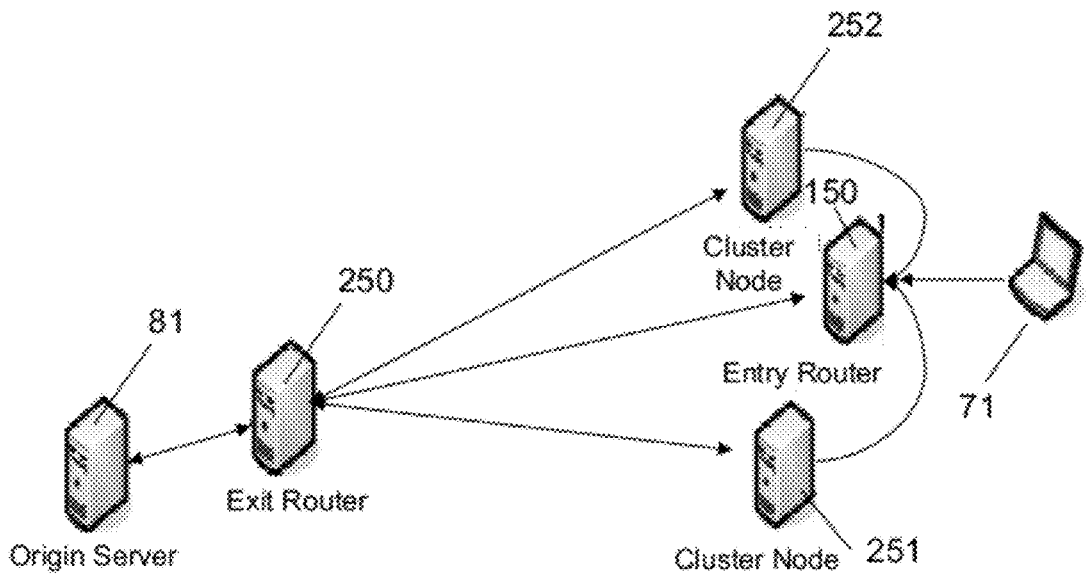

Parallel Networking

1. Clients connect to an entry router and place a request;

2. Entry router connects to a specifically chosen exit router;

3. The exit router connects to the origin server that contains the information that the client has requested;

4. When the exit router receives data it responds to a set of nodes that have been placed into a cluster;

5. Cluster nodes forward the responses to the entry router, which reassembles the packets into the correct sequence and responds to the client request.

*FIG. 18*

SYSTEM AND METHOD FOR WEBSITE PERFORMANCE OPTIMIZATION AND INTERNET TRAFFIC PROCESSING

CROSS REFERENCE TO RELATED CO-PENDING APPLICATIONS

This application claims the benefit of U.S. provisional application Ser. No. 61/267,149 filed on Dec. 7, 2009 and entitled DISTRIBUTED NETWORK SERVICE FOR TRAFFIC PROCESSING AND OPTIMIZATION, which is commonly assigned and the contents of which are expressly incorporated herein by reference.

FIELD OF THE INVENTION

The present invention relates to a system and a method for website performance optimization and Internet traffic processing, and in particular to an intermediary system that optimizes requests directed to a website and responses originating from the website.

BACKGROUND OF THE INVENTION

Every day, millions of people visit various websites for learning, reading, sharing, social networking, shopping, blogging, gaming, dating, dining and travel, among others. At the same time, millions of websites are trying to be successful in serving their objectives, whether it is to build an online business, support an offline business, or both. According to NetCraft, there are over 68,000,000 active websites as of March 2009, with over 1,400,000 new websites created every month for the last 15 years. While each website serves its own purpose, together they form part of the foundation of our society today.

The performance of a website directly impacts its success or failure in serving its objective. When a website is slow, users have to spend more time waiting and become less productive. More often, they lose patience, abandon their activities and leave. Further, users are much less likely to come back to slower websites. On the contrary, faster performance results in more pleasant user experience. Users are more productive and are more likely to come back.

The impact of web performance on business success has been demonstrated many times in the real world. The following is a partial list of web performance problems:

Amazon: 100 ms delay caused a 1% drop in revenue.
Google: 400 ms delay caused a 0.59% decrease in search requests per user
Yahoo!: 400 ms delay caused a 5-9% decrease in traffic.
Bing: 2 seconds delay caused a 4.3% drop in revenue per user.
Mozilla made their download page 2.2 seconds faster and was rewarded with an increase of 15.4% in downloads.
Google Maps reduced the file volume by 30% and observed a 30% increase in map requests.
Netflix enabled gzip on the server; simply by this single action pages became 13-25% faster and saved 50% of traffic volume!
Shopzilla succeeded in reducing the loading time from 7 down to 2 seconds, whereby the conversion rate increased by 7-12%, they observed a 25% increase in page requests, they were able to retire 50% of their servers, thus saving energy costs.
AOL observed the number of page views on several websites. While the fastest users requested 7-8 pages, the slowest only viewed 3-4.

Since the beginning of the web, website owners have been trying to find ways to improve their website performance. First, it is relevant to look at the factors that influence website performance.

The performance of a website is determined by a complex chain of elements along the web application delivery chain, starting from the data center where the website is running to the end user's browser.

When a user requests a web page, the user's browser sends out the request as an HTTP request. The HTTP request is transmitted from the user's computer to the user's last mile connectivity, which can be dial-up, DSL, Cable modern, wifi, cellular, T1, T3, among others, to some local Internet Service Provider (ISP). The request is further transmitted from the local ISP to some other ISP networks according the Internet's routing protocols (BGP). Along the path, there may be firewalls, network gateways, filters, address translations, among others, at each hop that the request passes through. If there is no error, eventually the request reaches the data center where the website is running Inside the data center, an HTTP server processes the request, which may go through a few additional steps such as invoking some middleware logic and database lookups, and eventually produces an HTML document. The HTTP server returns the HTML document in response to the HTTP request. The HMTL document is transmitted as an HTTP response message, traversing a similar network path along the chain, until eventually the HTTP response is received by the user's browser. The browser parses the HTTP response, interprets it and processes it. Once the browser recognizes the HTTP response is an HTML document, it starts to render the HTML document. Along the way of rendering, if the HTML page contains additional resources such as images, JavaScript files, cascade style sheet (CSS) files, media files, among others, the browser issues additional requests for these resources. Each request results in one round trip. It is fairly typical for today's web pages to require over 100 round trips. Eventually all these resources are loaded, the browser fully renders the page and the web page is ready for user interaction.

The various components that impact website performance along the delivery path can be classified into the following categories:

1. Factors related to web content complexity: the size of the HTML page, the number of additional round trip requests required by the page, Javascript files, CSS files, image files, video or other media files, third party widgets on the pages, among others. A more complex webpage may require more browser processing time and may also result in more number of round trips, which can require a longer wait time.
2. Client side factors: these include the browser itself, the speed of the client machine or device, and the performance of browser processing, among others.
3. Network related factors: the last mile connectivity, the network path and number of hops along the path from the client browser to reach a target HTTP server, network congestion conditions, latency, geographic distance, firewall and filtering along the network path, routing algorithms employed by the various hops along the path, network protocols and their efficiency, packet drop rate, among others
4. Server infrastructure related factors: the geographic locations of the HTTP servers, the number of HTTP servers and the performance of each server, the performance of other server side infrastructure required to fulfill HTTP requests, among others There are various approaches for optimizing website performance. Different approaches focus on different influence factors. The following lists these approaches:

1. Hire a smart web development team to optimize web content. Big websites typically employ this approach because they have the resources to find and engage the required technical talents. However, such talents are scarce and expensive. Most of the websites neither have the resources or bandwidth to do so. Google.com is a good example. The home page of Google.com, including The HTML code, Javascript, CSS files and images files, is highly optimized for fastest performance. It delivers great results but requires some of the best engineers on the planet to do so.
2. Build server infrastructure by adding more data centers to improve geographic coverage and redundancy or adding more hardware gears to improve the processing capacity, among others. Big websites typically employ many HTTP servers and use load balancing to distribute load to these HTTP servers. Some of them even built multiple data centers located in different geographic regions to reduce the impact of geographic latency. This approach requires not only substantial amount of infrastructure investments, but also requires significant technical talents to operate and manage these infrastructure operations. As a result, most websites that do not have the financial resources as these big websites have only limited options.
3. Use a Content Delivery Network (CDN): Content delivery network (CDN) is a network service that distributes static web assets to the edge of the Internet and serves them from locations that are geographically closer to the end user to improve the performance of webpage loading. There are many CDN services available to choose from, including vendors such as Akamai, LimeLight, Amazon CloudFront, EdgeCast, HighWinds, CDNetworks, ChinaCache, Cotendo, NetDNA/MaxCDN, SimpleCDN, ATT CDN, BigGravity, Advection.NET, Bitorrent, CacheFly, Velocix, Digital Foundation, GridNetworks, Ignite Technologies, Internap, Level 3 Communications, Mirror Image, Move Networks, NaviSite, Pando Networks, PEER1, SoftLayer CDN, Microsoft, Swarmcast, Tata Communications, or Voxel.net, among others. CDN is particularly useful for video streaming or large static asset distribution. To use a CDN service, a website needs to separate the static assets and upload them to the CDN, and then distribute the assets from the CDN. Traditionally CDN services were mostly used by big web properties as they have the required financial and technical resources to do so. Over the recent years, smaller but technically sophisticated websites started to adopt CDN services as well.
4. Use specialized network gears, such as Application Delivery Controller (ADC) and TCP/IP optimization gears. Many networking vendors including Cisco, Citrix, Bluecoat, and F5 Networks provide ADC devices that website owners can purchase and install to improve the performance of HTTP connection processing. These devices typically offer load balancing, caching, connection pooling, or even protocol optimization. These are widely adopted by large commercial websites. They are powerful but expensive, requiring not only significant upfront investment, but also ongoing maintenance and support.

Another approach is to optimize the client side browser performance. Different browsers have different strength. It is possible to exploit the unique strength of a particular browser to build a higher performing website. In fact, some websites do require a specific browser or browser version in order to perform. However, this is not a suitable approach for most websites because websites rarely have control on the client side user environment.

The current technology landscape for web performance optimization is complex with hundreds of factors involved. Each of the above mentioned approaches addresses only a small portion of these factors. To effectively optimize the performance of a website, significant technical know-how is required. It is a tedious and manual process that requires continued investment in order to yield results. In reality, most websites do not have the technical know-how, or the financial resources, to make such commitments. For these websites that do have the financial resources, they typically have to employ a large technical team, with skills covering both web development and network operations, to continuously evaluate the various techniques, experiment with them, monitor the results and iterate.

In summary, prior art web performance optimization approaches are complex, expensive, highly manual and are only affordable by large web properties. Accordingly, there is a need for a system and a method that addresses the above mentioned limitations in the current web performance optimization solutions.

SUMMARY OF THE INVENTION

In general, in one aspect, the invention features a system for optimizing the performance of a website that runs on one or more HTTP servers and is configured to receive HTTP requests from one or more clients via user agents and provide HTTP responses to the one or more clients. The system includes an intermediary component configured to connect to the clients and the servers via network connections. The intermediary component includes a traffic management system (TMS) that includes means for managing HTTP requests originating from the clients and targeting the servers and HTTP responses directed to the clients and means for redirecting the HTTP requests to the intermediary component. The intermediary component further includes a traffic processing system (TPS) that includes means for receiving the redirected HTTP requests and the HTTP responses and means for applying optimization techniques to the redirected HTTP requests and HTTP responses.

Implementations of this aspect of the invention may include one or more of the following features. The means for applying optimization techniques include means for applying browser optimization, means for applying content optimization, means for applying HTTP optimization, means for applying network optimization, means for applying content delivery network (CDN) optimization and means for applying infrastructure optimization. The intermediary component is cloud based and is configured to run in a private cloud, a public cloud or a hybrid cloud computing infrastructure. The cloud based intermediary component runs in different geographic locations around the world. The cloud based intermediary component includes means for scaling its processing capacity by scaling up and down the cloud based computing infrastructure in response to web traffic processing demand. The intermediary component further includes means for processing the redirected HTTP requests by applying one of fulfilling selected HTTP requests locally, relaying selected HTTP requests to the HTTP servers or relaying selected HTTP request to other HTTP hosts. The traffic management means further include means for directing the optimized HTTP requests to the website and means for directing the optimized HTTP responses to the users. The system traffic management means for redirecting the HTTP requests to the intermediary component comprise Domain Name Service (DNS) means for adding a Canonical Name (CNAME) to the DNS record of the website and means for resolving the CNAME to the intermediary component. The traffic management means for redirecting the HTTP requests to the intermediary component comprise DNS means for hosting the DNS record of the website and resolving DNS requests to the websites to the intermediary component. The traffic management means for redirecting the HTTP requests to the intermediary component comprise a network gateway and the HTTP requests and HTTP responses are configured to pass through the network gateway. The intermediary component may be one of a proxy server, a library module that runs as part of the one or more HTTP servers that host the website or a hardware device or appliance that connects the clients to the one or more HTTP servers. The means for applying content optimization comprise means for optimizing HTML pages, means for optimizing JavaScript files, means for optimizing CSS files, means for optimizing image files and means for optimizing media files. The optimization means reduce the number of HTTP requests required to load the webpage. The means for optimizing HTML pages include means for minification, Gzip, resource bundling, de-duplication, request order shifting, resource inlining and using DataURI technique. The means for optimizing JavaScript files include means for minification, Gzip, JavaScript file bundling, obfuscation, de-duplication, deferred execution, JavaScript inlining and using DataURI technique. The means for optimizing CSS files include means for minification, Gzip, CSS bundling, obfuscation, de-duplication, CSS inlining and using DataURI technique. The means for optimizing image files include means for metadata removal, color table adjustment, right sizing, sprite, compression and using DataURI technique. The means for optimizing media files include means for metadata removal, viewpoint right sizing, transcoding and compression. The means for applying browser optimization include means for detecting a specific browser and its unique capabilities and means for rewriting web content to utilize the specific browser's unique capabilities in order to improve browsing experience. The means for applying browser optimization include means for providing domain sharing in order to enable multiple browser connections. The means for applying browser optimization include means for using SPDY protocol if the browser supports it, means for detecting viewport and prioritizing HTTP content that are visible in the viewport, means for optimizing HTML page layout for a specific browser to improve rendering time and means for detecting the caching capability of the browser and maximizing client side caching. The means for applying browser optimization include means for using optimized TCP protocol to communicate with a web browser. The means for applying browser optimization include means for detecting a web browser as being a mobile web browser and transforming the webpage content to fit into the mobile web browser screen display and rendering. The means for applying CDN optimization include means for CDN stuffing that optimize website performance by detecting cacheable assets, automatically storing the cacheable assets in selected CDNs, managing these assets and serving them from these CDNs. The means for applying CDN optimization include means for CDN balancing that optimize website performance by monitoring the performance and cost of various CDNs and serving assets from the best CDN according to a certain measure. The means for applying HTTP optimization include means for pre-fetching to optimize website performance by analyzing an HTTP response for additional web resources that it requires, requesting such web resources from one the HTTP servers before requests for such resources have been received, and serving such resources upon receiving such requests. The means for applying HTTP optimization include means for improving webpage loading speed by applying "Gzip" compression to HTTP content and setting "Gzip" header, using HTTP 1.1 when possible to reuse HTTP connections, using SPDY protocol when client-side user agent supports it, using optimized TCP protocol to communicate with client-side user agent, setting proper HTTP caching headers, and offloading HTTPS/SSL processing from the one or more HTTP servers. The means for applying network optimization include means for improving webpage loading speed by using an optimized network protocol, detecting connection congestion status and selecting less congested connections, optimizing TCP parameters to improving connection handling with a client-side browser as well as the one or more HTTP servers. The means for applying network optimization include means for using intermediary nodes to communicate relay connections between a client-side web browser and the one or more HTTP servers, wherein the intermediary nodes communicate with the client-side web browser using optimized TCP connections comprising one of 3-way handshake, window size, error handling, packet size, packet count and acknowledgement handling. The means for applying network optimization include means for using intermediary nodes to relay connections between a client-side web browser and the one or more HTTP servers, wherein the intermediary nodes communicate with the HTTP servers using optimized TCP connections by reusing existing connections, or optimizing TCP parameters comprising one of 3-way handshake, window size, error handling, packet size, packet count and acknowledgement handling. The means for applying network optimization include means for using multiple intermediary nodes to relay connections between a client-side web browser and the one or more HTTP servers, wherein the intermediary nodes communicate with each other using optimized communication means. The optimized communication means comprise high speed links or tuned communication channels. The means for applying network optimization comprise means for using multiple intermediary nodes to relay connections between a client-side web browser and the one or more HTTP servers, and the intermediary nodes communicate with each other using multiple parallel connections, and split traffic payload among these parallel connections for network transmission. The means for applying infrastructure optimization comprise means for DNS optimization, means for increasing the number of HTTP server presences, means for providing server load balancing, means for providing global load balancing and means for improving server reachability by adding more data centers or adding more edge presences. The intermediary component further includes means for changing its configuration and optimization settings and these means include one of a user interface, an application programming interface or both.

In general, in another aspect, the invention features a method for web performance optimization including the following. Providing one or more clients configured to send HTTP requests via web browsers. Next, providing a website running on one or more HTTP servers and being configured to receive the HTTP requests and provide HTTP responses to the users. Providing an intermediary component that manages HTTP requests originating from the clients and targeting the servers and HTTP responses originating from the servers and targeting the clients and redirects the HTTP requests to the intermediary component. The intermediary component receives the HTTP requests directed to the website, receives the HTTP responses directed to the clients and applies optimization techniques to the HTTP requests and HTTP responses.

In general, in another aspect, the invention features a method for routing and processing network traffic including the following. Providing first and second parties. Each party is configured to run on one or more computing devices and is accessible via a first network. Providing a second network comprising a plurality of traffic processing nodes. Providing means for redirecting network traffic from the first network to the second network. Redirecting network traffic originating from the first party and being directed to the second party from the first network to a traffic processing node of the second network via the means for redirecting network traffic. Optimizing and processing the redirected network traffic by the traffic processing node and routing redirected network traffic that has been optimized and processed by the traffic processing node to the second party via the second network.

Implementations of this aspect of the invention may include one or more of the following features. The second network is an overlay network superimposed over the first network. The first network is the Internet. The first party is a web browser and the second party is a website. The second network scales up and down its processing capacity by adjusting its number of traffic processing nodes based on the traffic processing needs. The optimizing and processing includes optimizing the redirected network traffic for faster performance. The optimizing and processing includes optimizing the redirected traffic content to reduce the number of round trips, and to reduce traffic payload. The method optimizing and processing includes optimizing network connections between the first party and the traffic processing node. The optimizing and processing includes optimizing network connections between the second party and the traffic processing node. The traffic processing node relays the redirected network traffic to one or more additional traffic processing nodes, and the one or more additional traffic processing nodes optimize and deliver the optimized network traffic to the second party. The traffic processing nodes use optimized network connections between each other to improve communication performance. The traffic processing nodes use parallel networking between each other to improve communication performance, by splitting traffic into multiple packets, delivering the multiple packets over multiple connections in parallel, and re-assembling the multiple packets at a receiving traffic processing node.

Among the advantages of this invention may be one or more of the following. Based on the concept of overlay networks and cloud computing, the present invention discloses an Internet routing system that uses many commodity nodes available from typical cloud computing infrastructure such as Amazon EC2, instead of specialized equipments, to deliver both performance and economy of scale. Though each node itself is not as powerful and reliable as a specialized router, combining many of them together can achieve high performance and high availability. The present invention uses software that run on commodity hardware, instead of application specific integrated circuitry, to route traffic. The present invention provides on-demand scaling, instead of provisioning a fixed capacity. This reduces costs and carbon footprint without sacrificing quality of service. The present invention significantly enhances Internet traffic routing by leveraging the recent advancements in cloud computing. This cloud-based routing gives us a better alternative to Internet routing by overcoming the current inefficiencies while lowering the associated cost and carbon footprint.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

FIG. 18 shows an improved parallel network system according to this invention.

DETAILED DESCRIPTION OF THE INVENTION

Over the recent years, cloud computing has emerged as an efficient and more flexible way to do computing. Cloud computing "refers to the use of Internet-based (i.e. cloud) computer technology for a variety of services ("Cloud Computing", http://en.wikipedia.org/wiki/Cloud_computing). It is a style of computing in which dynamically scalable and often virtualized resources are provided as a service over the Internet. Users need not have knowledge of, expertise in, or control over the technology infrastructure 'in the cloud' that supports them". The word "cloud" is a metaphor, based on how it is depicted in computer network diagrams, and is an abstraction for the complex infrastructure it conceals. In this document, we use the term "Cloud Computing" to refer to the utilization of a network-based computing infrastructure that includes many inter-connected computing nodes to provide a certain type of service, of which each node may employ technologies like virtualization and web services. The internal works of the cloud itself are concealed from the user's point of view.

Various vendors provide cloud computing infrastructure to customers using a "pay as you go and pay for what you use"

model, including Amazon.com's Elastic Computing Cloud (EC2), RackSpace, SoftLayer, GoGrid and FlexiScale. All cloud infrastructures provide ways for a customer to dynamically start new nodes or shut down existing nodes in a matter of a few minutes. There are also many vendors providing an end-to-end stack for customers to build and deploy cloud-based applications, notably Google's App Engine and Microsoft's Azure. Further, many customers have built cloud-based applications. By utilizing commodity hardware and virtualization, cloud computing has proven to be able to increase computing efficiency, enhance operational flexibility and reduce costs.

The present invention applies cloud computing techniques to Internet routing as a way to address the scalability and economic challenges of adopting new ways of Internet routing. The invention leverages the recent advancements in cloud computing to automatically scale up and scale down infrastructure capacity in response to network load demand while intelligently routes traffic through optimal routes and transport, delivering much improved performance, reliability and security, while reducing cost and carbon footprint associated with such routing activities.

Figure 1:
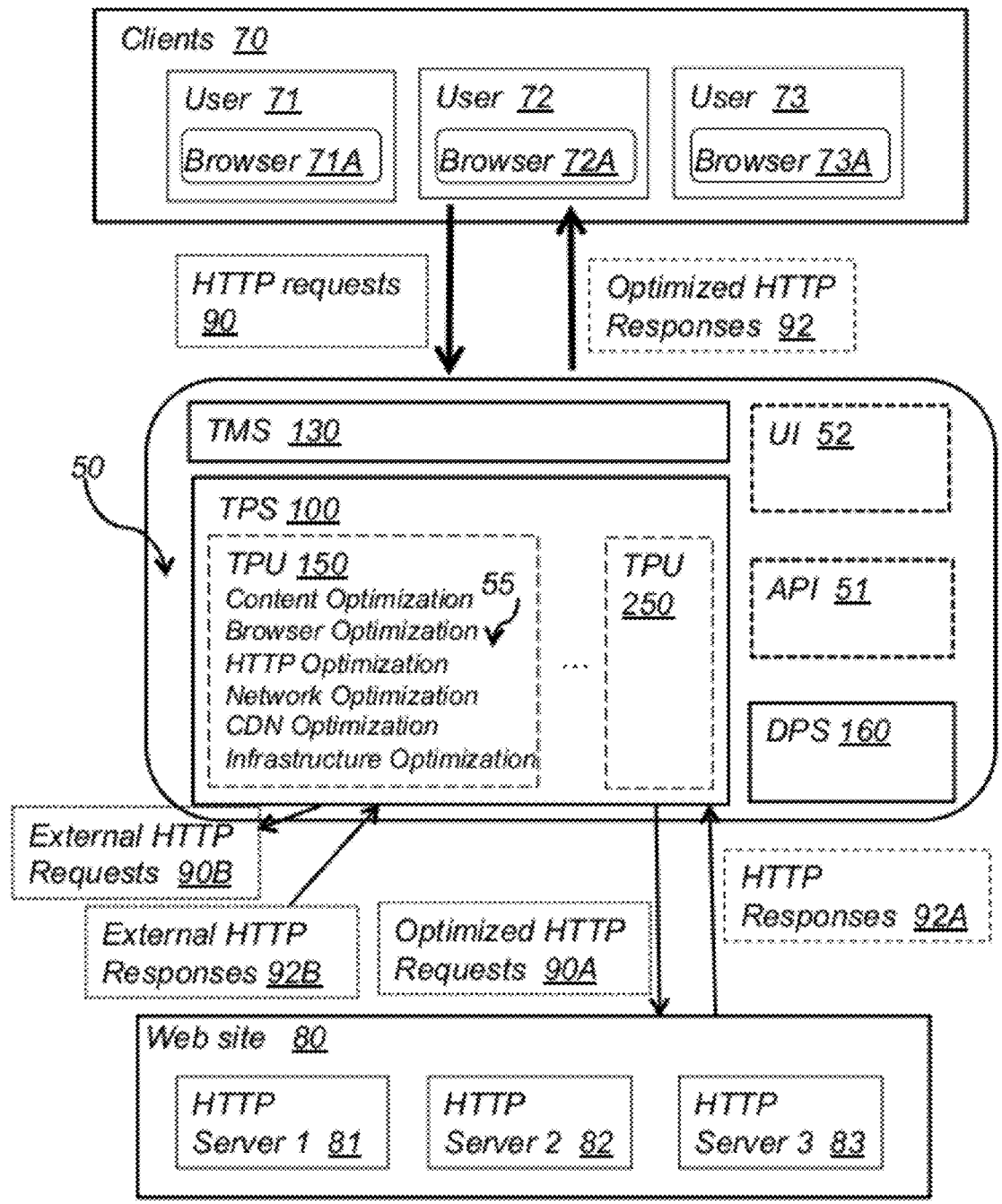
FIG. 1 is an overview diagram of a web performance optimization (WPO) system.
Figure 2:
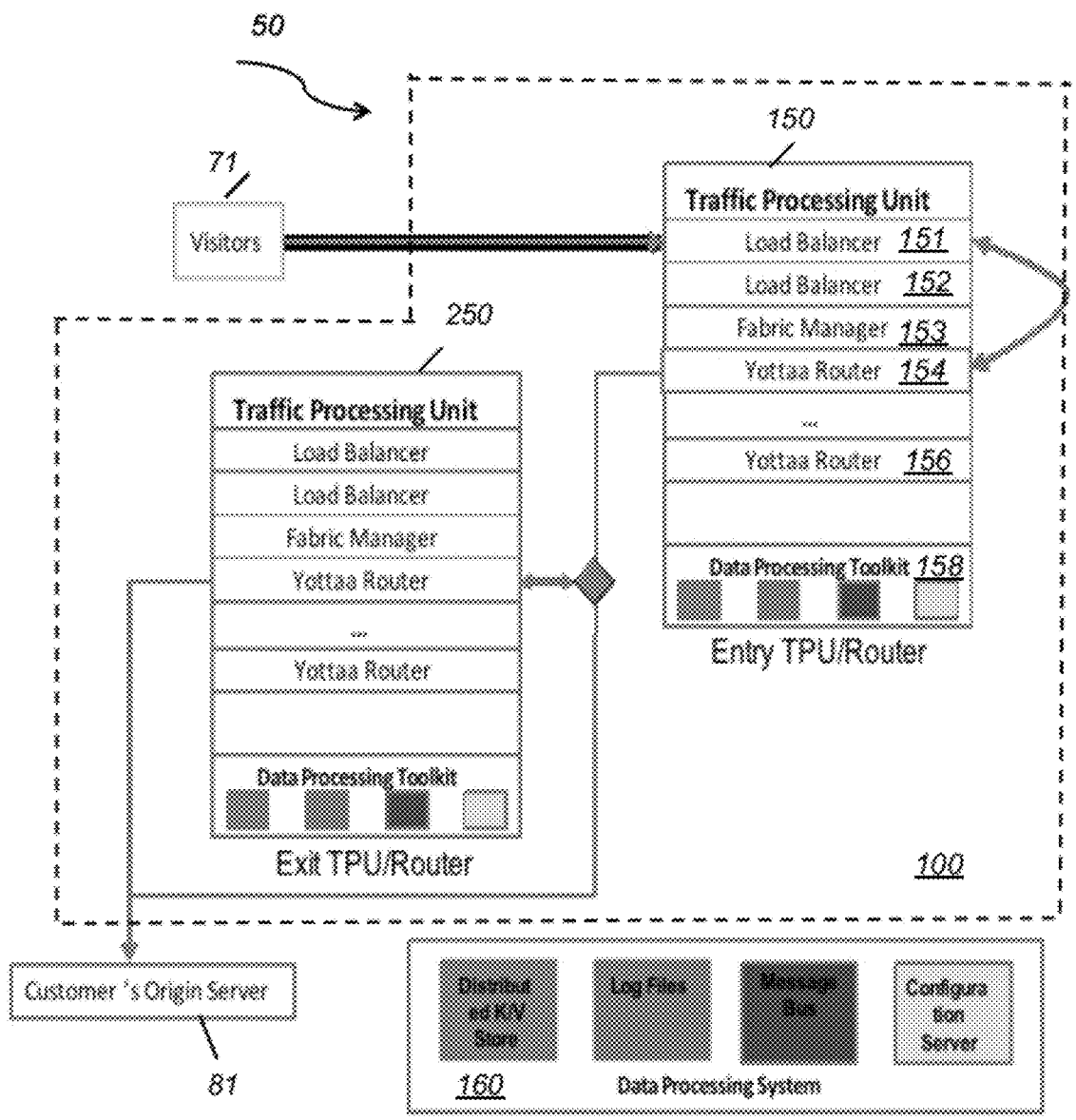
FIG. 2 shows the high level design of a Traffic Processing System (TPS)
Figure 3:
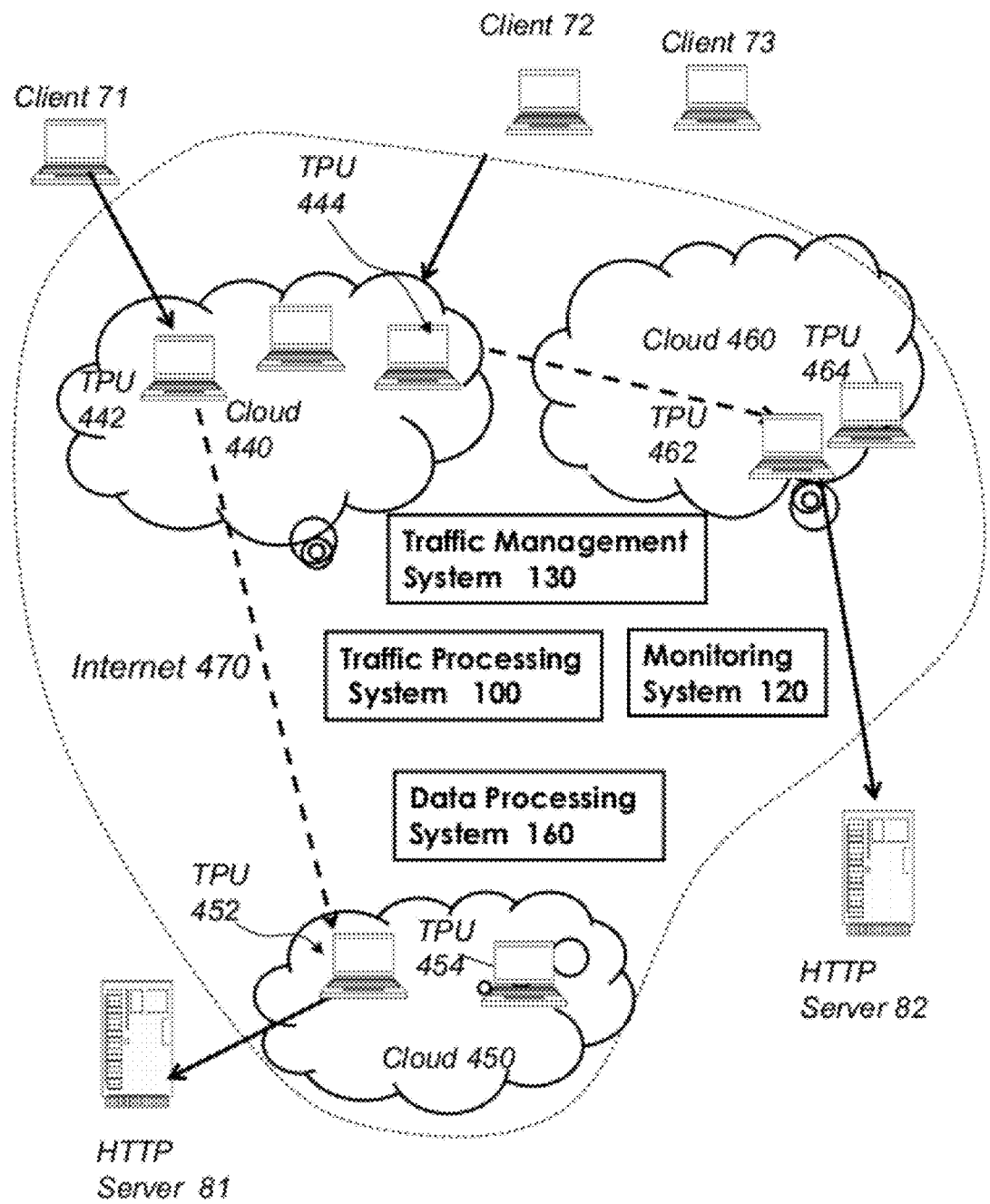
FIG. 3 depicts a schematic diagram of a cloud-based WPO.

Referring to FIG. 1, FIG. 2 and FIG. 3, a web performance optimization system (WPO) 50 includes a traffic processing system 100 (TPS), a traffic management system 130 (TMS) and a data processing system 160 (DPS). The web optimization system 50 further includes an application programming interface (API) 51 and a user interface (UI) 52. The TPS 100 includes geographically dispersed traffic processing units (TPU), such as TPU 150, TPU 250, shown in FIG. 1 and FIG. 4 or TPU 444, TPU 442 in cloud 440, TPU 464, TPU 462 in cloud 460, TPU 454, TPU 452 in cloud 450, shown in FIG. 3. TPS 100 receives and processes HTTP communications, request and responses between clients 70 and website 80 and TMS 130 manages the routing of client requests through TPS 100. DPS 160 contains the various data gathered for optimal traffic processing, such as status of the network, status of various HTTP servers, settings, configuration, optimization status, customer information, pricing information, website performance, optimization technique configurations, load balancing preferences, among others. Third parties can also use user interface 52 or API 51 to query, add, remove and adjust the settings, status, configuration of the entire system to achieve desired results.

Web users 71, 72, 73 use web browsers 71A, 72A, 73A to connect to hypertext transfer protocol (HTTP) servers 81, 82, 83 where website 80 is running When the web users issue HTTP requests 90 to website 80, these HTTP requests are directed to pass through the intermediary component 50. This HTTP request re-direction is managed via the TMS 130. Upon receiving HTTP requests 90 from web users 71, 72, 73, TPS 100 applies optimization techniques 55 to process these requests. As a result of optimization, some of the requests are fulfilled locally within TPS 100, some of the requests are forwarded to external hosts for fulfillment, such as external HTTP requests 90B, and some of the requests are forwarded to website 80 for processing, such as optimized HTTP requests 90A, As responses to optimized HTTP requests 90A, TPS 100 receives HTTP responses 92A from website 80. Further, as responses to external HTTP requests 90B, intermediary component 50 also receives external HTTP responses 92B. Upon receiving any of these HTTP responses, TPS 100 immediately applies optimization techniques 55 to optimize the received HTTP response. After optimization processing, TPS 100 eventually forwards the processed HTTP responses 92 to clients 70. The optimization techniques 55 include the following categories: content optimization, browser optimization, HTTP optimization, network optimization, Content Delivery Network (CDN) optimization and infrastructure optimization.

Content optimization reduces the number of HTTP requests required to load a webpage and includes optimization of the following items: Hypertext Mark-up Language (HTML) pages, JavaScript files, Cascading Style Sheets (CSS) files, image files and media files. Content optimization of HTML pages includes minification, Gzip, resource bundling, de-duplication, request order shifting, resource inlining and Data Uniform Resource Interface (DataURI) technique. Content optimization of JavaScript files includes minification, Gzip, JavaScript file bundling, obfuscation, de-duplication, JavaScript inlining, JavaScript concatenation and compression, deferred execution and DataURI technique. Content optimization of CSS files includes minification, Gzip, CSS bundling, obfuscation, de-duplication, CSS inlining, sprite, concatenation and compression and DataURI technique. Content optimization of image files includes metadata removal, color table adjustment, right sizing, sprite, DataURI technique and compression. Content optimization of media files includes metadata removal, viewport right sizing, transcoding and compression. Furthermore, HTTP web content optimization includes domain sharing.

Browser optimization refers to detecting the unique capabilities of the specific browser of each web user (client) and rewriting content to utilize the specific browser's unique capabilities in order to improve the browsing experience. Browser optimization techniques include domain sharing, SPDY (Speedy), client-side caching, viewport detection and prioritization and mobile transformation. Domain sharing (or splitting) refers to taking a bunch of resources that are being downloaded on a single domain and splitting them across multiple domains to enable multiple simultaneous connections. SPDY refers to an experimental application-layer protocol for transporting content over the web, designed specifically for minimal latency. Client-side caching refers to detecting the caching capability of the client browser and maximizing client-side caching. Viewport detection and prioritization refers to optimizing HTTP content that is visible in the detected viewport and optimizing HTML page layout for the specific client browser to improve rendering time. Mobile transformation refers to detecting the client browser as a mobile browser (i.e., browser for mobile communication devices) and transforming the web content to fit the mobile browser screen display and rendering.

HTTP optimization refers to techniques used to improve webpage loading speed. HTTP optimization includes applying "Gzip" to HTTP content and setting "Gzip" header, using HTTP 1.1 when possible to reuse HTTP connections, using SPDY protocol when client side user agent supports it, setting proper HTTP caching headers, offloading HTTPS/SSL processing from HTTP server and prefetching. Prefetching refers to optimizing website performance by analyzing an HTTP response for additional web resources that are required, requesting such web resources from the target server before requests for such resources have been received, and serving such resources upon receiving such requests.

Network optimization refers to techniques used to improve webpage loading speed. Network optimization includes using optimized transport protocols rather than TCP protocol, detecting connection congestion status and selecting uncongested connections, optimizing TCP parameters to improving connection handling with the client side browser as well as the target HTTP server, connection reuse, use of SPDY and use of parallel networks. The intermediary component uses multiple intermediary nodes to relay connections between the browser and the target HTTP server. The intermediary nodes communicate with each other using an optimized network protocol. In some embodiments, the intermediary nodes communicate with each other using multiple parallel connections, and split traffic payload among these parallel connections for network transmission.

CDN optimization includes CDV stuffing and CDN balancing. The intermediary component uses CDN stuffing to optimize web performance, by detecting cacheable assets, automatically storing the cacheable assets in selected CDNs, managing these assets and serving them from these CDNs. The intermediary components uses CDN balancing to optimize website performance, by monitoring the performance and cost of various CDNs and serving assets from the best CDN according to a certain measure.

Infrastructure optimization includes Domain Name Service (DNS) optimization, increased number of servers, server load balancing, global load balancing and improved reachability by adding more data centers and/or by adding more edge presence for assets.

Figure 4:
FIG. 4 depicts a geographically distributed WPO.
Figure 5:
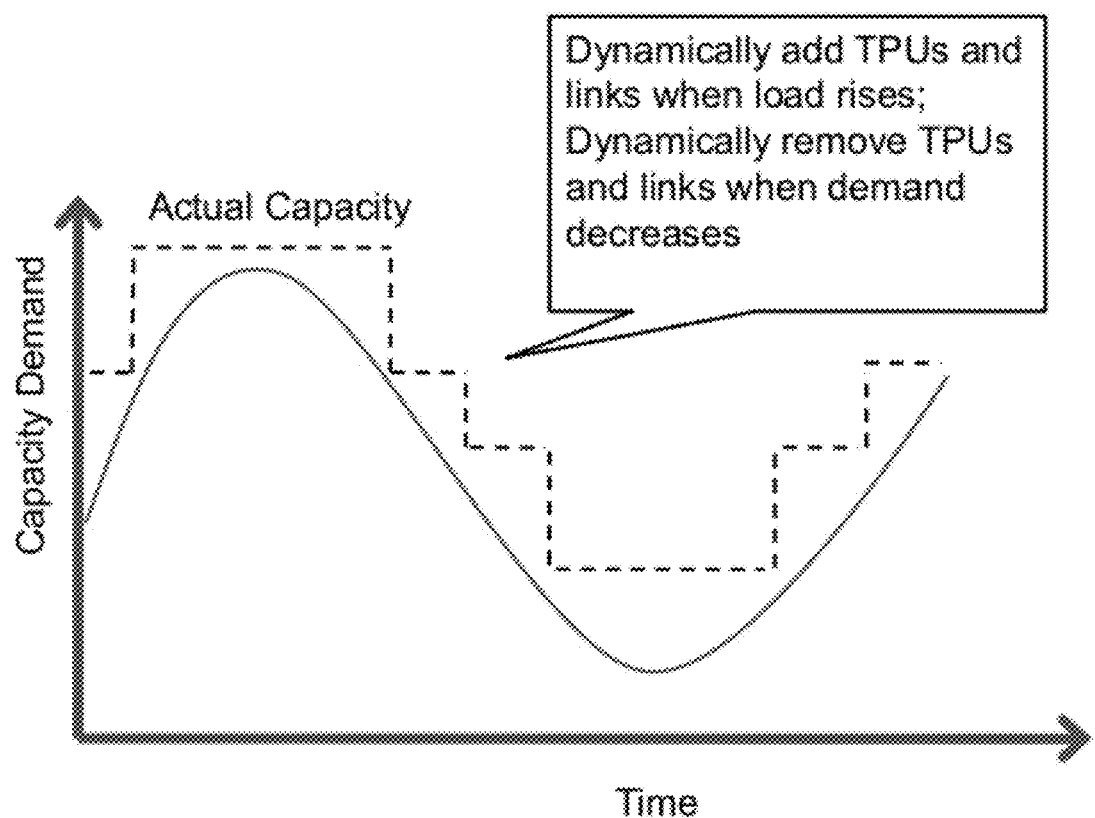
FIG. 5 depicts the elastic scalability of the traffic processing system (TPS)
Figure 6:
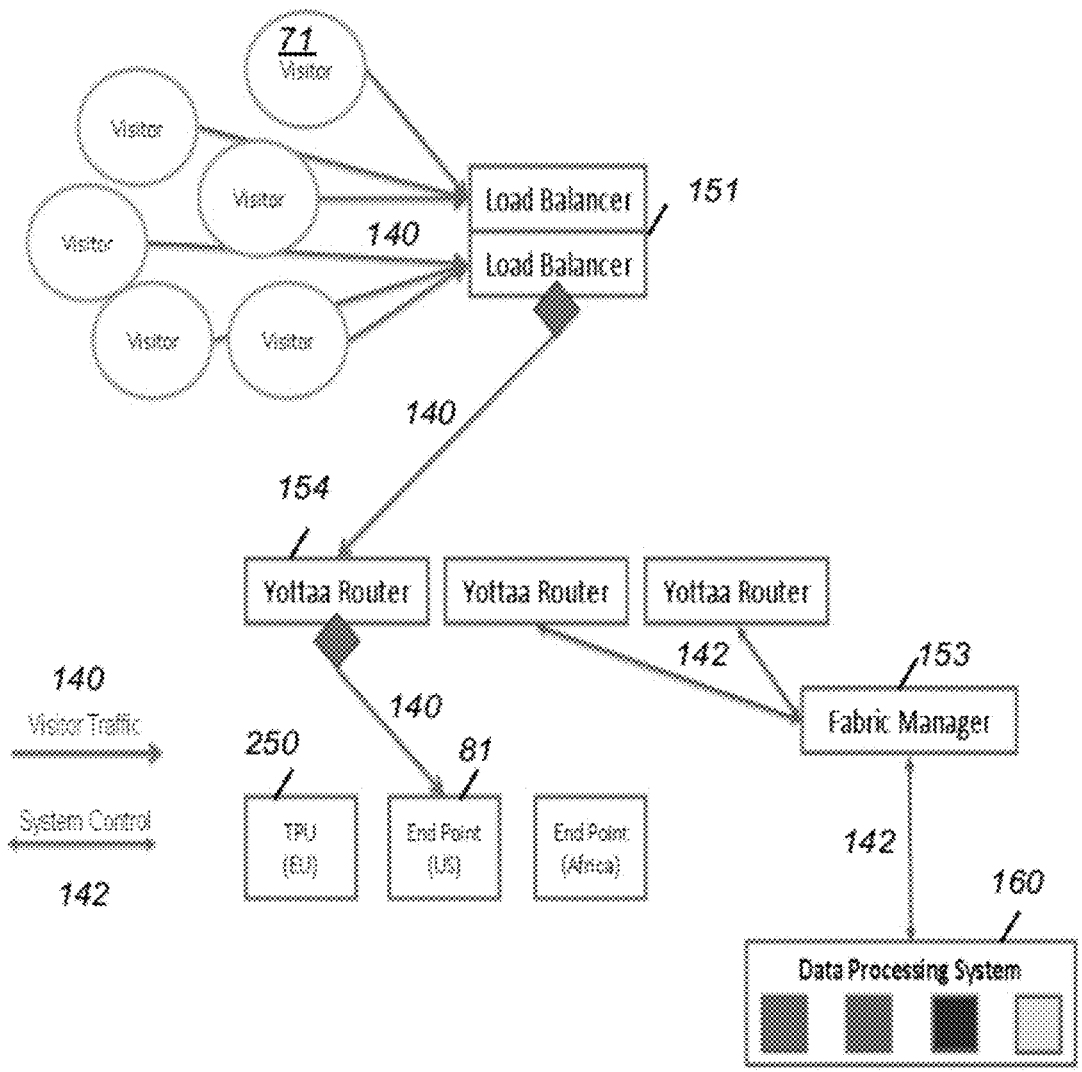
FIG. 6 shows the high level design of a Traffic Processing Unit (TPU)

In one example, TPS 100 is a proxy server. In other examples TPS 100 is a library module that runs as part of the HTTP servers or a hardware device that connects web visitors 73, 72, 71 to the HTTP servers 81, 82, 83. The TMS 130 redirects the HTTP requests 90 from the web users to the TPS 100. The TPS 100 applies the above mentioned optimization techniques to the HTTP request and forwards the optimized request 90A to the target server 81 of website 80. The target server 81 processes the optimized HTTP request 90A and sends back an HTTP response 92A to the TPS 100. The TPS 100 applies the above mentioned optimization techniques to the received HTTP response 92A and sends an optimized HTTP response 92 to the user's browser 73A. The intermediary component 50 is cloud based and is designed to run on a private cloud, public cloud or a hybrid cloud computing infrastructure, as shown in FIG. 3. This cloud based system is designed to run in many different geographic locations around the world, as shown in FIG. 4. The cloud based intermediary component system adjusts its processing capacity by scaling up and down its computing infrastructure capacity in response to the traffic processing demand, as shown in FIG. 5. This cloud routing network is also called an "Application Delivery Network (ADN)" sometimes in the rest of this document. The traffic management mechanism 130 that redirects traffic to the intermediary component 50 is a domain name service (DNS) based mechanism. A canonical name (CNAME) is added to the DNS record of the website 80 domain name (www.yahoo.com) and the CNAME is resolved to the proxy server 100. In other embodiments, the DNS record of the website is hosted in the TPU and the TPU resolves the DNS requests to the proxy server. In other embodiments, the traffic management mechanism is a network gateway based mechanism and webpage requests are configured to go through this network gateway.

The invention also describes a method for using content delivery network services by adding web assets to selected content delivery networks and then selecting the most appropriate content delivery network for serving content requests so that a certain measure is optimized. The content delivery networks may be one of the following: Akamai, LimeLight, Amazon CloudFront, EdgeCast, HighWinds, CDNetworks, ChinaCache, Cotendo, NetDNA/MaxCDN, SimpleCDN, ATT CDN, BigGravity, Advection.NET, Bitorrent, CacheFly, Velocix, Digital Foundation, GridNetworks, Ignite Technologies, Internap, Level 3 Communications, Mirror Image, Move Networks, NaviSite, OctoShape, Pando Networks, PEER1, SoftLayer CDN, Microsoft, Swarmcast, Tata Communications, or Voxel.net, among others. The certain measure that is optimized may be performance metric, cost metric or combination of performance and cost metrics. The method may also include selecting different content delivery networks for serving different users from different geographic locations. The method may also include using an intermediary component to process webpage (including CSS and JavaScript files) requests. The intermediary component analyzes additional web resources referenced by these pages, fetches these additional resources and adds them to a list of CDNs, and modifies the web page URL references so that these additional resources are served from selected CDNs according to a certain measure. The modified URL references point to a selected CDN directly. Alternatively, the modified URL references point to a certain domain name that requires DNS resolution via a DNS service. During DNS resolution phase, the DNS service selects the most appropriate CDN service according to a certain measure, and returns appropriate IP addresses or domain names of the selected CDN service so that the selected CDN serves the requested content.

To ensure the TPS's goal is being met, we will present the solution from four different perspectives:

A network of geographically distributed traffic processing units (TPU) (relative to end user density)
Redundancy within a given TPU location (node)
Location and backbone providers
On-demand scalability of processor, memory, disk and networking capacity.

Terms
  Traffic Processing System (TPS)—The overall traffic processing infrastructure which includes globally distributed Traffic Processing Units (TPU), mostly located in data centers that offer on-demand scalability.
  Traffic Processing Unit (TPU)—A set of deployable components that can fulfill a visitor's request and apply traffic processing services and traffic management services.
  Traffic Processing Services—The set of services that can be applied to visitor traffic as it streams through a TPU; content optimization is one example of a traffic processing service.
  Traffic Management Services—The set of traffic management services that can be applied to a visitor's resource request; session grooming is an example of a traffic management service.

Geographic Diversity

In order to ensure a distribution of geographic locations with on-demand scalability, the system takes advantage of cloud infrastructure providers. Some of these cloud providers include Amazon EC2, GoGrid, RackSpace, SoftLayer, ATT, Fujitsu, Savvis, FlexiScale, Verizon, among others.

System Overview

As noted above the traffic processing system (TPS) 100 is a collection of traffic processing units 150, as shown in FIG. 1. Once a visitor 71 resolves a host name to a TPU 150, all traffic generated by the visitor will be sent to that IP Address. Each TPU 150 has a load balancer 151, 152 at each of its public IP addresses, as shown in FIG. 2. Once the traffic is sent to the load balancer, a TPU router 154, 155 or 156 will be chosen to forward the traffic to the customer's server 81.

The TPU router is responsible for applying both traffic processing and traffic management services. When a router receives a client's request, the router sends the request to another TPU 250, the customer's origin server 81, or respond immediately if it can (i.e., information is in the local store or request blocked).

Traffic Processing Unit (TPU) 150 provides the scalable infrastructure that accepts incoming visitor requests and applies traffic processing services to them before and after sending the requests to the customer's end point, known as an origin server 81. FIG. 2 shows the high level design of a TPU. Each TPU includes one or more load balancers 151, 152, one or more routers 154, 155, 156, a fabric manager 153 and a data processing toolkit 158, as shown in FIG. 2. A load-balancer is at each of the TPU's public IP addresses. The load-balancer spreads the traffic over the TPU's routers. The router software is custom designed software and it can accept incoming traffic apply traffic processing services and then send the traffic to a customer's origin server, another TPU or response directly. Each TPU has at least one fabric manager 153 that all routers talk to. The fabric manager 153 has server responsibilities, including monitoring, instance management, communication with the Data Processing System (DPS) 160 and unit-level performance calculations. The data processing toolkit (DPT) 158 has the ability to interact with the rest of the system in four ways; access to key/value store, distributed log file publication, message Bus, and the configuration server.

The system 50 uses the following information:
Geo-location of visitor IP addresses
All TPU unit-level information
Best path information (visitor to a customer's origin server)
Customer Application Delivery Network (ADN) Information.

The system 50 creates the following information:
Generation of Log Information.
Generation of unit-level information
   load
   location
   IP addresses
   alerts As was mentioned above, the traffic processing services include content optimization, HTTP optimization, load balancing, parallel networking and message protocol.

Content Optimization

Web pages are made up of many different web resources that vary in their content-type and purpose. Each web resource is stored and requested individually on a web server. This web page structure makes deployment of web pages and websites easy as there is no building process needed for web resources. However, the issue with this deployment model is that the web browser needs to request each of the web resources individually. The web browser requests one web resource and then processes it to see if other web resources are needed. If more resources are required, it will request them one at a time and then it will repeat the process.

Today's websites require many web resources to create the interactivity and presentation envisioned by their designers. Ajax, Web 2.0, and Collaboration Websites all lead to an increase in the interactivity and design required to acquire and keep customers. Developers take the ideas and design and implement web pages by breaking up the page into images, JavaScript, CSS, HTML, and media (Flash, Sound, Video). Developers do this in a way that makes it quick to build, debug, deploy, test, and maintain. This web page development process usually results in resources being broken down into specific tasks including, JavaScript files that implements a specific set of tasks, CSS files that manage the presentation of a certain section, component or element of a page, and images that display one graphical element of a page. The above mentioned method of processing these multi-resource containing web pages by a web browser causes the following issues.

Browsers can only open a limited number of connections to the web server. For instance, if the browser can only create two connections with a web server, resource requests will be queue up until the previous resource is completely downloaded.

Large amount latency between the web browser and visitor, creates an even greater amount of page load time because of the request queue.

Content may be larger than required by the web browser for rendering purposes. Developers typically include whitespace and comments in the resources to make development easier. Developers also structure the resource in a non-optimal way for downloading and rendering.

Duplicate content wastes bandwidth. Duplication can either be multiple links to the same resource or multiple pieces of content within resources that are the same.

The content optimization service of the TPS system resolves these issues by default and without developers having to change the way they build their websites or create their resources. The method for providing content optimization includes the following steps. First, a client wanting to use the TPS content optimization service creates an Application Delivery Network (AND). Next, the client changes their DNS setting for their website to point to the TPS's traffic management system. When a visitor requests a resource from the client's website, the request is routed to one of the TPS routers. Next, the router requests the resource from the client's origin server. When the origin server responds with the content, the client's optimization scenario configures the routers content optimization service to apply the desired optimization techniques.

By applying the content optimization as it is streamed through the routers, the TPS achieves a significant reduction in the number of resources requested and the amount of the bytes needed for each resource. This results in a significant savings in web page loading time and user experience.

Definition of Terms

Router

A node within the TPS's routing platform. It can be any machine or process that is designated to process incoming traffic and apply the TPS's traffic services.

Origin Server

A server that is specified by the client to serve original content for a visitor's request.

Traffic Management System

A collection of machines and/or processes that can resolve DNS requests based on a client's ADN settings.

Application Delivery Network (ADN)

An Application Delivery Network is the set of configuration parameters that is needed to process traffic for a particular client of the TPS.

Optimization Scenario

A set of configuration variables within a client's ADN, which determines how the content optimization engine is applied to a visitor's requests.

Optimization Techniques

A set of content specific processing units that are applied to content. Each processing unit is designed to optimize the content in a specific way. Below is a list of optimization techniques that are applied to content:

HTML

Resource Bundling—takes multiple resources of the same type and combines them into single resources. This technique can be applied to CSS files, JavaScript files and Images Duplicate Resource Removal—removes resource requests that are the same as a previous resource.

Resource Request Shifting—changes the order in which resources are requested by the browser. This is done by moving their location into a more preferred location in the HTML file. An example of this is moving JavaScript resource requests to the end of the HTML page

CSS

Resource Bundling—resolves embedded CSS import statements

GZipping—applies a GZip encoder to a CSS files to decrease its size. This technique also changes the content-type and content-encoding headers so that the web browser renders it correctly.

Minification—removes comments and whitespace from CSS files.

Duplicate Content Removal—removes content within a CSS file that is a duplicate of another section.

Property Optimization—changed properties are specified individually to be specified inline if they can be. An example of this is changing css element
->.myClass {background-color:#aaa; background-image:URL('test.jpg')} to
->.myClass {background: #aaa URL('test.jpg')}

Element Optimization—removal of any unneeded characters within a CSS element declaration. An example of this is removing the trailing ";" in the last property. In .myClass {color:#aaa;} the ";" after #aaa is removed.

CSS Spriting—turns multiple background images into a single image and changes their associated CSS element properties.

JavaScript

Minification—removes comments and whitespace from JavaScript files.

Obfuscation—shrinks the variable names and parameters of JavaScript code.

GZipping—applies a GZip encoder to a JavaScript files to decrease its size. This technique also changes the content-type and content-encoding headers so that the web browser renders it correctly.

Duplicate Content Removal—removes content within a JavaScript file that is a duplicate of another section.

Images

Meta-data Removal—removes unneeded meta-data from images

Color Table Adjustment—changes the color table in images to create a smaller image Right-sizing—changes the size of the image to match the display size when rendered Compression—changes the image's compression variable to become smaller Media Compression—changes the media's compression variable to make the media smaller Transcoding—changes the format of the media to match the visitor's device properties. An example of this is changing a Flash page element into an image for displaying it on an iPhone.

Description of End-To-End Content Optimization

Application Delivery Network Creation

As was mentioned above, first, a client creates an ADN configuration that specifies at least one parameter, i.e., the IP address or hostname of the origin server to forward the traffic to when received. Other information can be added to the ADN configuration to enhance the functionality of the TPS platform. As part of the ADN creation process, the TPS supplies a client with an unique hostname that they will be used in their Name/DNS server's settings. Once the client supplies the origin server information, an ADN will be created in the TPS's central configuration database. ADN information can be fetched and modified by clients through various interfaces such as a graphical user interface (GUI) or an application programming interface (API). The TPS platform components fetch the ADN information based on the hostname present in the HTTP requests using the programmatic API. Once the client has created their ADN, they need to change their DNS entry for traffic that they want to be redirect through the TPS platform.

Traffic Management System

Once the client has created their ADN and modified their DNS entries, visitors will start to resolve DNS requests via the TPS's traffic management system. The TPS's traffic management system resolves the DNS requests by choosing a Traffic Processing Unit (TPU) or a client origin server and returns it's IP address. The selection of the TPU or the origin server is made by matching a variable number of conditions such as, geographic location, latency, throughput, and any value that can be obtained by the DNS resolver and matched to the value specified by the ADN configuration, TPS or TMS.

Figure 7:
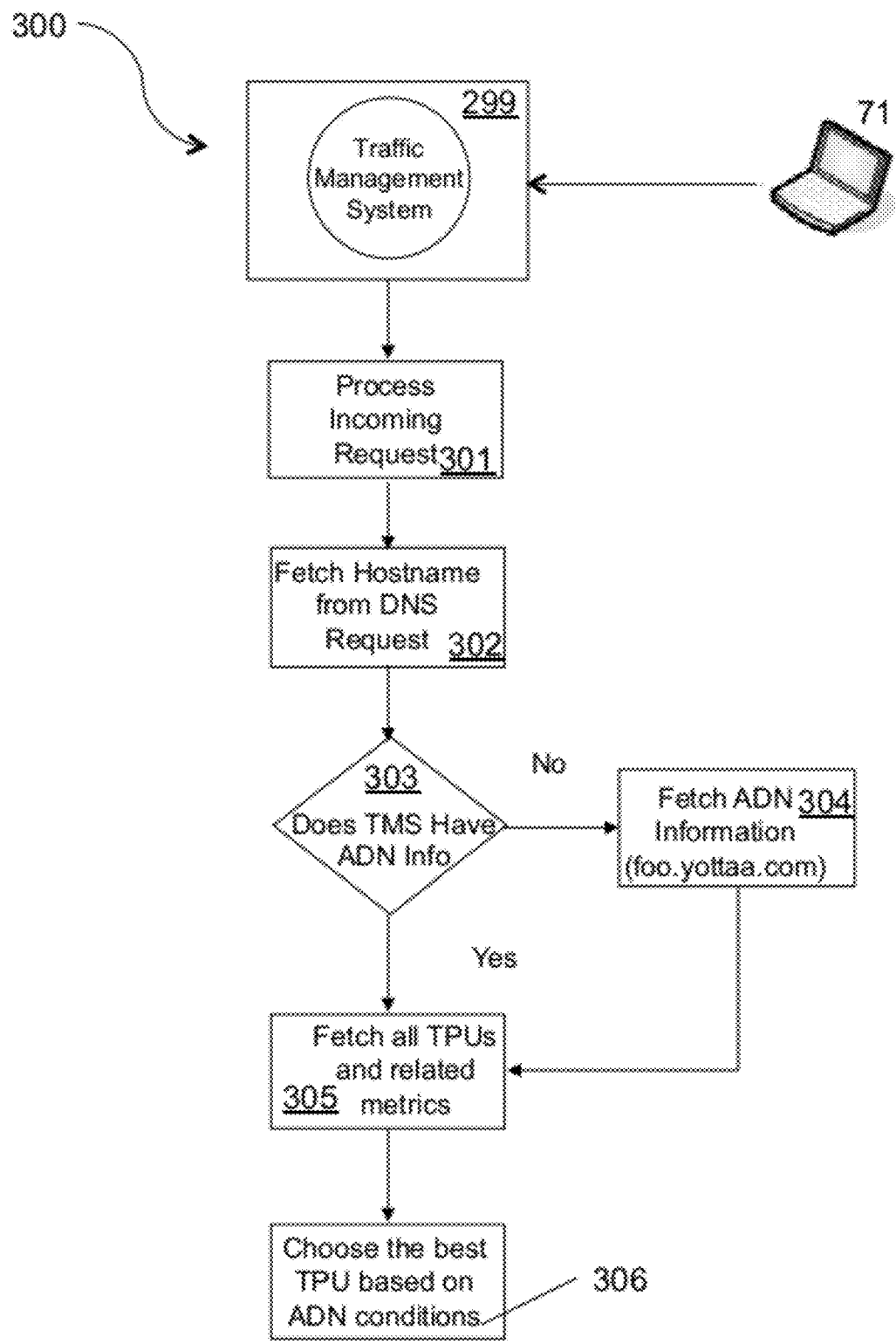
FIG. 7 depicts a block diagram of the traffic management work flow.

Referring to FIG. 7, the traffic management work flow 300 includes the following. Once the traffic management system receives a DNS request (299), it sends it to the request processor, which then changes the request's data into an object (301). This object is then used by the rest of the system. Based on the "name" field of the DNS request (302), the traffic management system checks to see if the ADN information is currently present (303). If the ADN information is not present, the ADN configuration is fetched from the configuration server by looking up the information based "Host" field (304). This value is then matched to the unique hostname that was supplied to the client when they created their ADN. The traffic management system will then retrieve the latest metric information needed to choose which TPU to direct the visitor (305). Once the metrics have been collected, the TMS will compare each TPU against the set of conditions that are present in the ADN (306).

Figure 8:
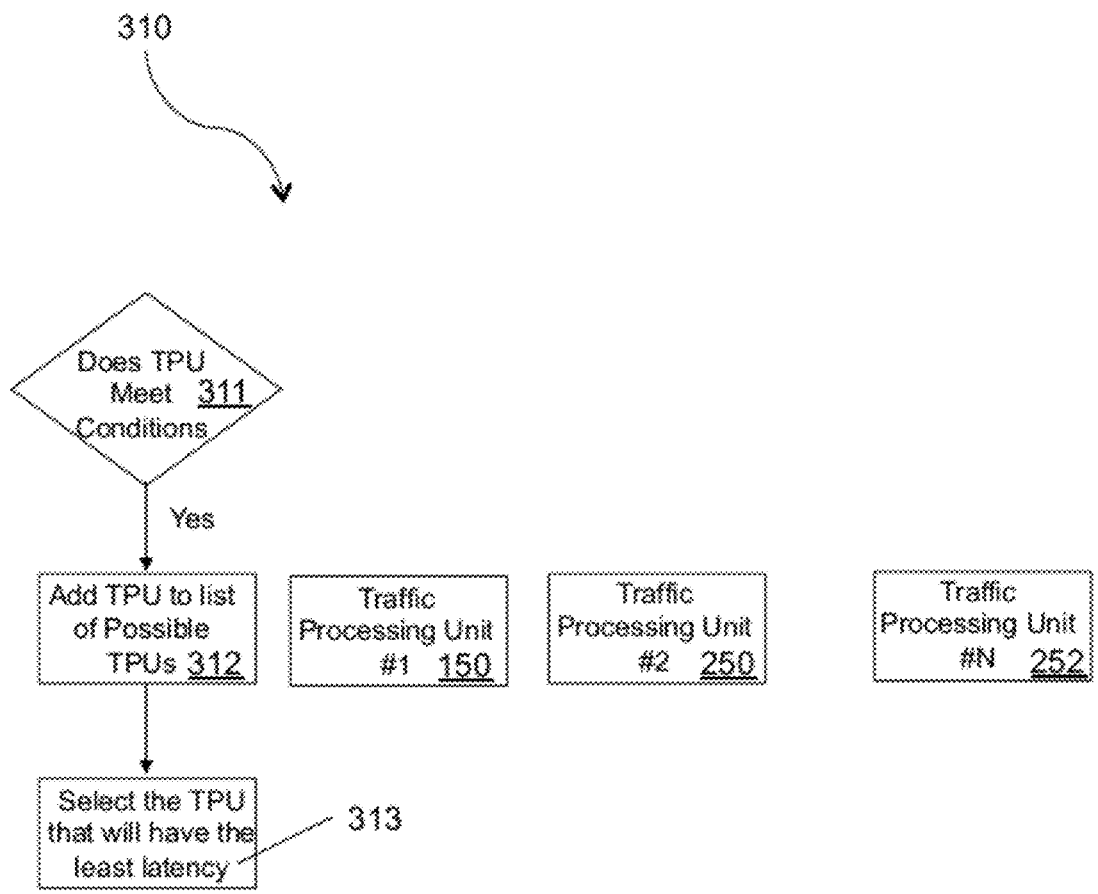
FIG. 8 is a block diagram of the TPU selection process.

The TPU selection process 310 is shown in FIG. 8. If the TPU passes the set of conditions (311), it will be placed in the list of possible TPUs (312). After all TPUs have been tested, the system chooses the TPU that provides the lowest latency for processing visitor traffic (313). The lowest latency is determined using timing information, geographic information, historical information, and the TPU's performance information. After the visitor's DNS request is returned with the TPU's IP address, all requests to the client's hostname are sent to the selected TPU.

Figure 9:
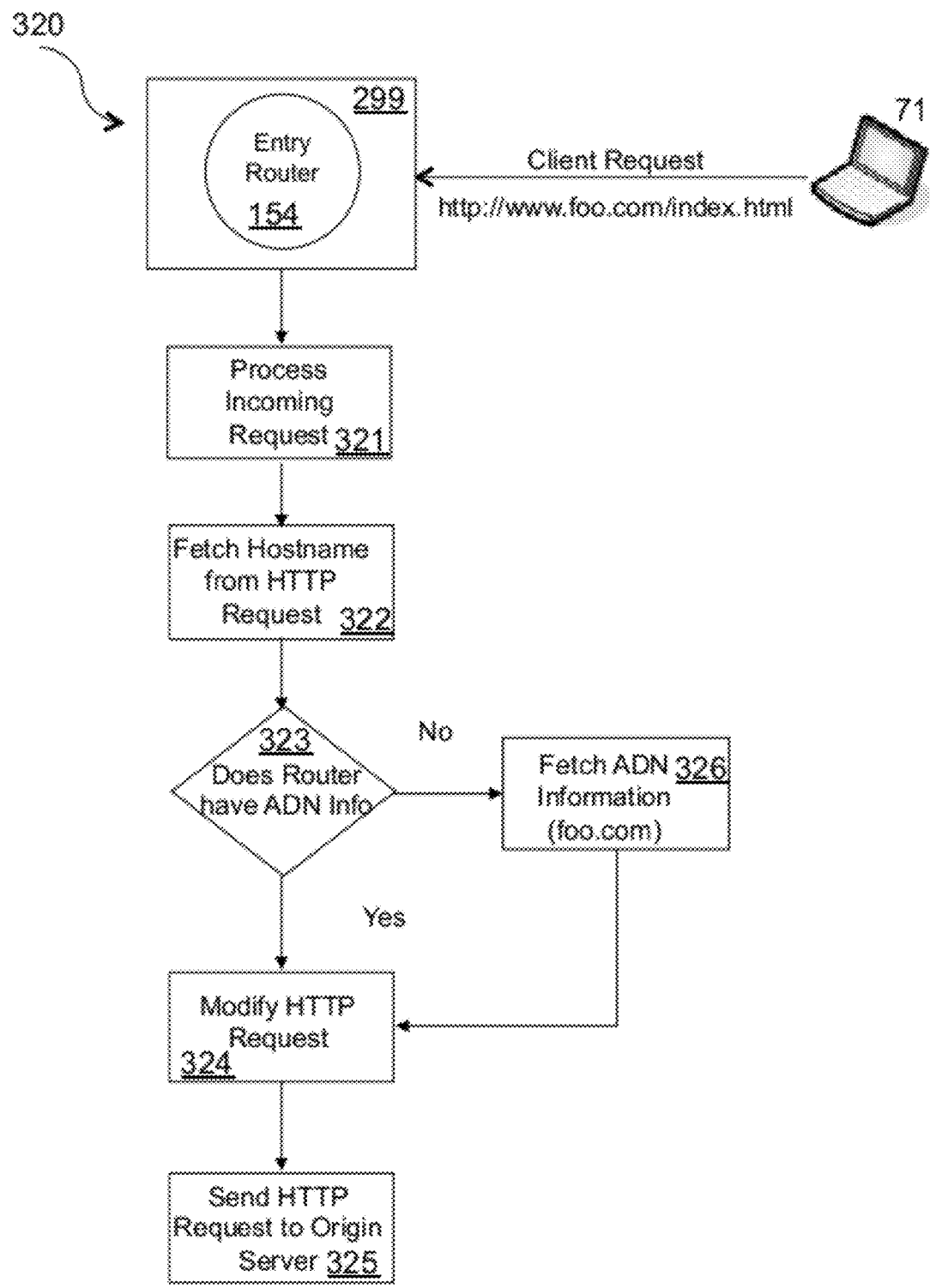
FIG. 9 is a flow diagram of a request processing by the TPU.

Once a TPU receives a client request it processes it according to the flow diagram 320, shown in FIG. 9. First, client 71 sends a client request (http://www.foo.com/index.html) and the request is directed to entry router 154 of the selected TPU (299). Next, the request information is processed into an HTTP request object (321). This object is then used throughout the lifecycle of the request. An example of an HTTP request is shown below with a "Host" HTTP header value of "foo.com".

-------- BEGIN HTTP REQUEST ---------------
GET / HTTP/1.1
Host: foo.com
User-Agent: Mozilla/5.0 (Windows; U; Windows NT 5.1; en-US;

```
rv:1.9.1.3)
Gecko/20090824 Firefox/3.5.3
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
--------- END HTTP REQUEST --------------
```

Next, the host name is fetched from the HTTP request (322). Using the host name in the HTTP request, the router 154 checks if the latest copy of the client's ADN configuration is present (324). If new information is needed, it will fetch the ADN information for the configuration database based on the host name (326). If the ADN information is present, the router may modify the HTTP request (324) before sending it to the client's origin server (325). A request may be modified because some origin servers 81 require the "host" HTTP header to match the address of the server rather than the one sent by the client's web browser. An example of the modified HTTP request is shown below.

```
--------- BEGIN HTTP REQUEST --------------
GET / HTTP/1.1
Host: the TPS.foo.com
User-Agent: Mozilla/5.0 (Windows; U; Windows NT 5.1; en-US;
rv:1.9.1.3)
Gecko/20090824 Firefox/3.5.3
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
--------- END HTTP REQUEST --------------
```

After the HTTP request is modified, it is sent to the client's origin server using a standard HTTP connection (325). HTTP connections are recycled as long as then can be based on HTTP Keep-Alive information. Connection reuse increases performance of the overall request processing because connection creation is an expensive process.

Figure 10:
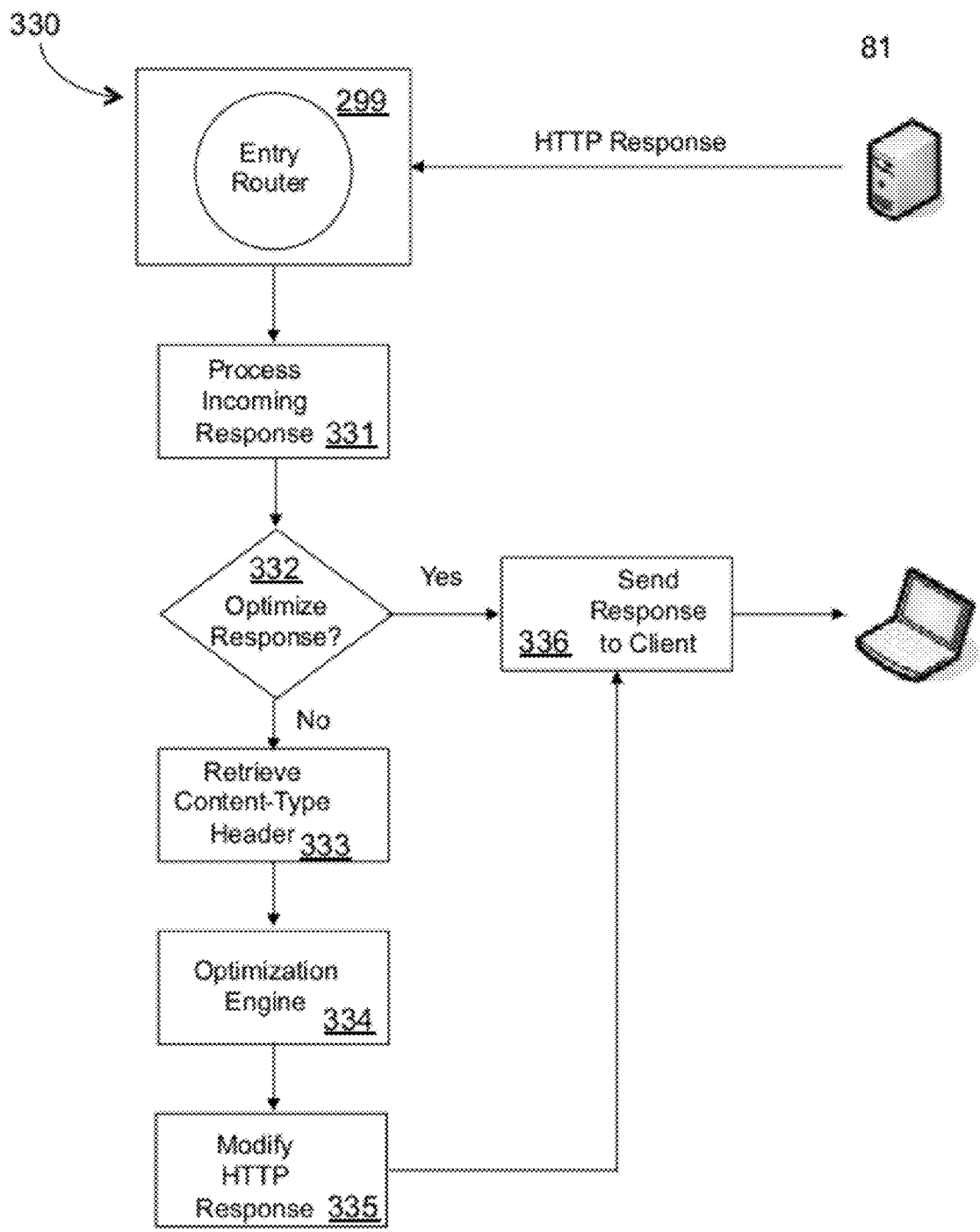
FIG. 10 is a flow diagram of the response processing by the origin server.

Referring to FIG. 10, the processing of the response 330 includes the following steps. The origin server 81 send the response to the TPS router (299). The TPS's routing functionality changes the response of the origin server into an object (331) and pass it through the rest of the work flow. Once the object is created, the TPS tests whether or not the content should be optimized (332). If the content should be optimized, the object is passed into the content optimization engine (333). If the content should not be optimized, the response is sent back to the requester 71 (336). The requester can be another TPS router or a visitor. Whether or not the content should be optimized is made by testing one of the following:

Is the ADN configured for optimization?
What are the conditions of optimizations for any of the values including content-type, URL, session or another variable that is determined at the time of the test.

After the content is optimized a new response object is created that contains the optimized content (335) and then sent to the requester (336).

Figure 11:
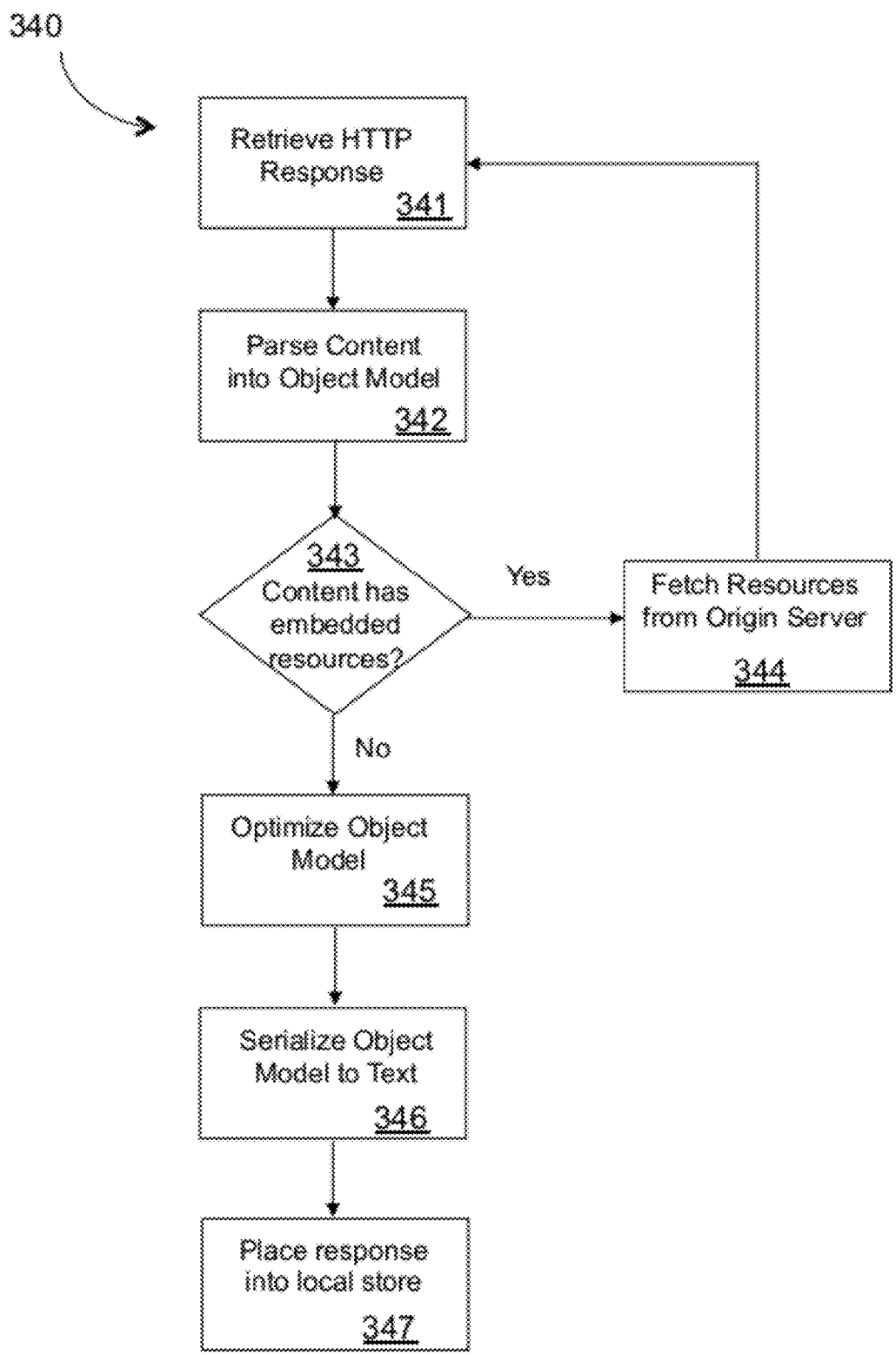
FIG. 11 is a flow diagram of the content optimization process.

Referring to FIG. 11, the content optimization process 340 includes the following steps. Once the request object is passed into the content optimization engine, the engine retrieves all the resource's content from the request object and pass it to the content specific parser (341). The parser turns the content into an object model that can easily be navigated, modified, and reserialized (342). Content parsing may require the content to be completely available before parsing can occur. If this is the case the request objects are aggregated until all content is present. Content parsers that require the full set of information are known as "Document Parsers". Content parsers that can parse the response as they arrive are "Stream Parsers". Once the content is parsed into an object model, it is checked for embedded resource requests (343). Any embedded resource request will be fetched and passed back into the content optimization engine (344). After fetching embedded resource requests, the request object is passed to a content specific optimization process (345). This process optimizes the content based on the optimization scenario in the client's ADN configuration. The list of possible content optimizations include optimization of HTML pages, optimization of JavaScript files, optimization of CSS files, optimization of image files and optimization of media files, among others. After the content is optimized it is serialized back into text (346), and placed into the local "content store" (347). The optimized response is placed into the content store because the content that was optimized may not have been requested yet. This is the case of embedded resource requests, i.e. CSS files, JavaScript files, media or image files that are optimized as part of the HTML's content optimization process. Furthermore, the optimized response is placed into the content store in order to avoid re-generating the optimized content. Optimization is a time consuming process and therefore in order to limit the CPU and memory overhead needed for running the optimization process again, the optimized content is placed in the local content store. Optimized content that is placed in the local content store is assigned a unique set of identifiers including URL, session cookie, or other visitor identifier, which can be used to retrieve the stored content. The content optimization engine may choose to distribute fetching embedded resource requests and their subsequent optimization across several servers.

Figure 12:
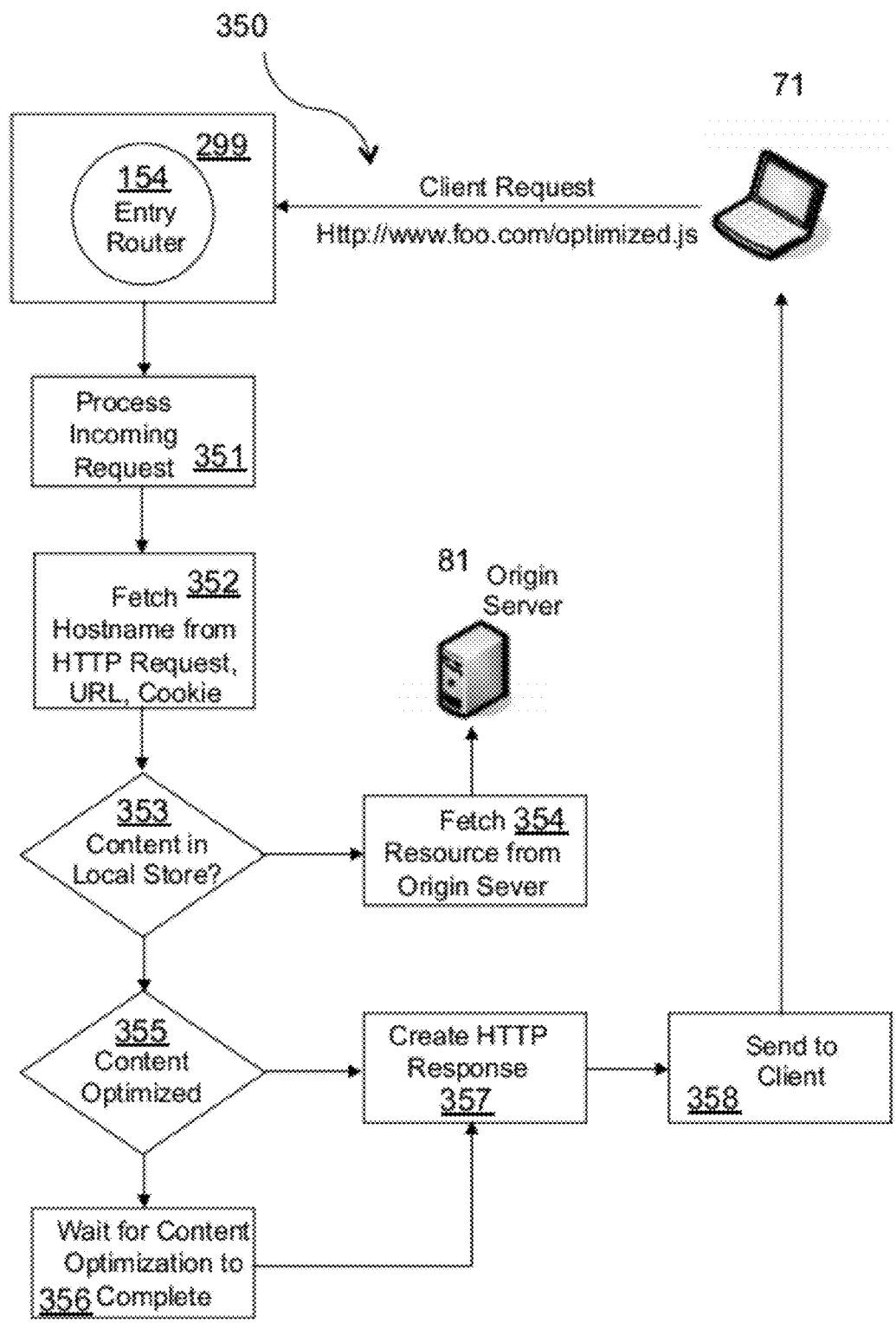
FIG. 12 is a flow diagram of a client future-request processing.

Referring to FIG. 12, the processing of future requests 350 for content that has been previously optimized includes the following steps. When a request comes in for content that has been previously optimized (299), the router 154 processes the request into a request object (351). The request object is passed into the local content store to see if a response to the request already exists (352). By testing the properties of the request object, including URL, cookies, host name, among others, the system determines if the content is stored in the content store (353) and if the content has been previously optimized (355). If the optimized content is found in the local content store, the system creates an HTTP response object (357) and sends it to the client (358). If the optimized content is in the process of being optimized, the system waits until the content optimization process is completed (356) and then creates an HTTP response object (357) and sends it to the client (358). If the content is not in the local store, the system fetches the content from the origin server (354).

HTTP Optimization

The TPS provides a set of HTTP optimization techniques that increase the performance of the origin server. These HTTP optimization techniques include cache header correction, connection reuse, pre-fetching, distributed content store, store cleaning and keep-alive.

In some cases, web applications set cache headers incorrectly. This results in poor application performance. The TPU optimizes the headers by providing and fixing the content response of cache headers including Etag, Expires, Cache-Control and Last-Modified.

"Connection reuse" refers to reusing open HTTP connections as many times as possible. This minimizes the impact of running traffic through the TPS. Once a connection is created and has finished processing a visitor's request, it is placed in a pool of connections that can be selected to process a new request. HTTP connections are configured to understand the "keep-alive" signal, i.e., a message sent from one device to another to check that the link between the two devices is operating.

Pre-fetching refers to requesting resources that are embedded within the requested content prior to the browser's request. Once a resource, such as an HTML page is retrieved the pre-fetch functionality starts requesting the additional resources that are embedded within the content of the HTML page that the browser will request in the future, optimizes them and stores them in the local content. This reduces the response time for retrieving all the embedded content that is required for the complete response without adding a significant amount of additional processing. In cases where multiple router hops are required for retrieving content, the content is pushed to the "entry" router so that the response time can be further reduced. The TPS system stores resources in the local content store and then tries to retrieve them before requesting them from the customer's origin server.

Figure 13:
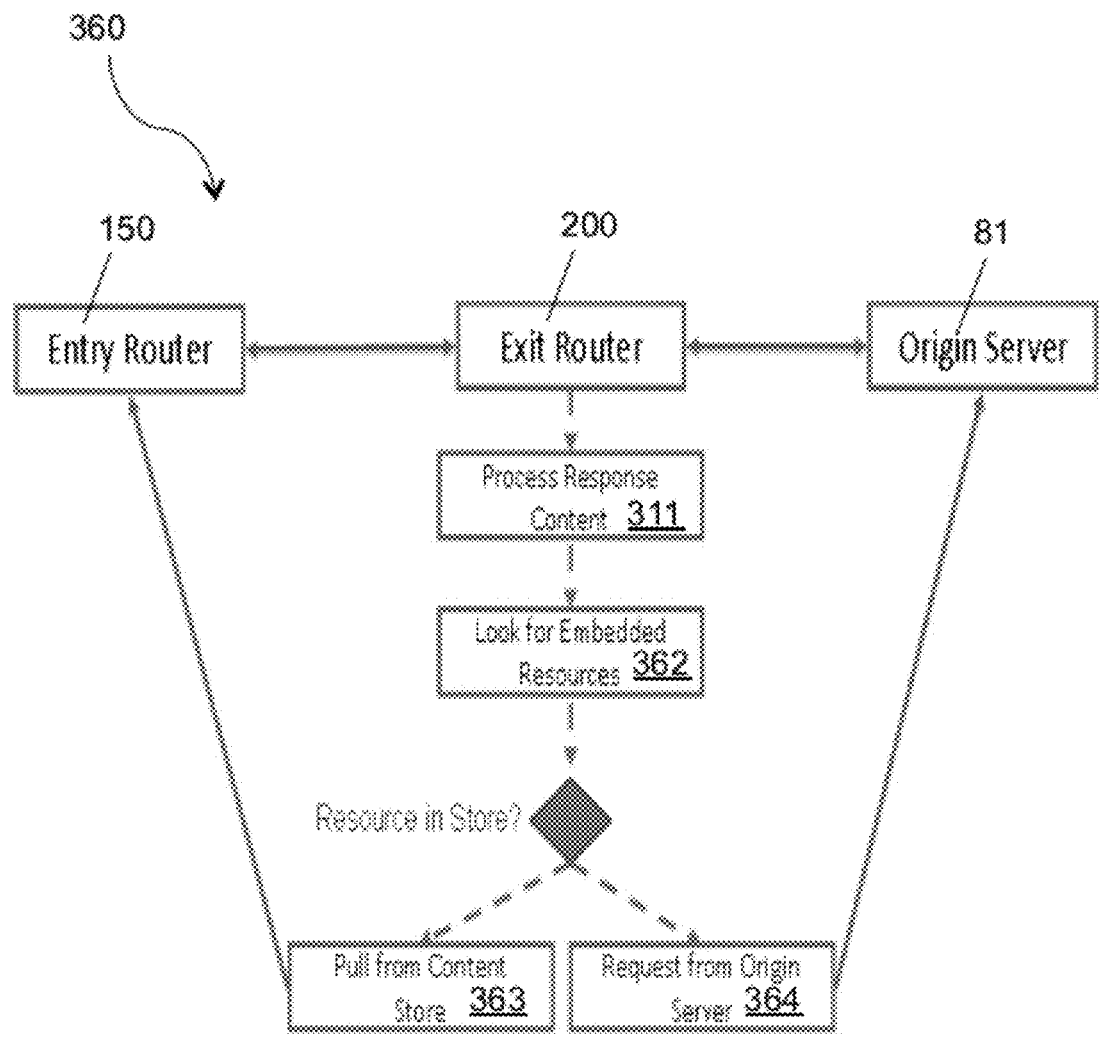
FIG. 13 is a flow diagram of the pre-fetching process.

Referring to FIG. 13, the pre-fetching process 360 includes receiving a client request by the entry router 150 and sending it to the exit router 200. The exit router 200 processes the response content (311) and looks for embedded resources (362). If the resources are in the local content store it retrieves them (363) and sends them back to the entry router 150, which then forwards it to the client. If the resources are not in the local store they are requested from the origin server 81 (364). The TPS router retrieves content in the following order. First content in the "in-memory" local store is retrieved. Next, content in the "disk" local store is retrieved. Next, content from other routers within the TPU is retrieved and then content from other TPUs within the TPS is retrieved. The content store automatically moves content into and out of in-memory, disk and other distributed stores based on the number of requests, and the amount of storage available to the store. Things that have a high request rate are the fastest to fetch while things that have a lower request rate have slower fetch. Content is placed in a specific content store based on factors such as fees paid for the service.

The system allows customers to perform store cleaning by removing old content from the store using the customer portal. This allows visitors to receive the newest content from the origin server. The system's TPUs provide "keep-alive" headers to the visitors. This allows the client software on the visitor's machine to reuse HTTP connections. If this is not done then the user will suffer from poor performance because HTTP or TCP connections are extremely expensive to create.

Load Balancing

Figure 14:
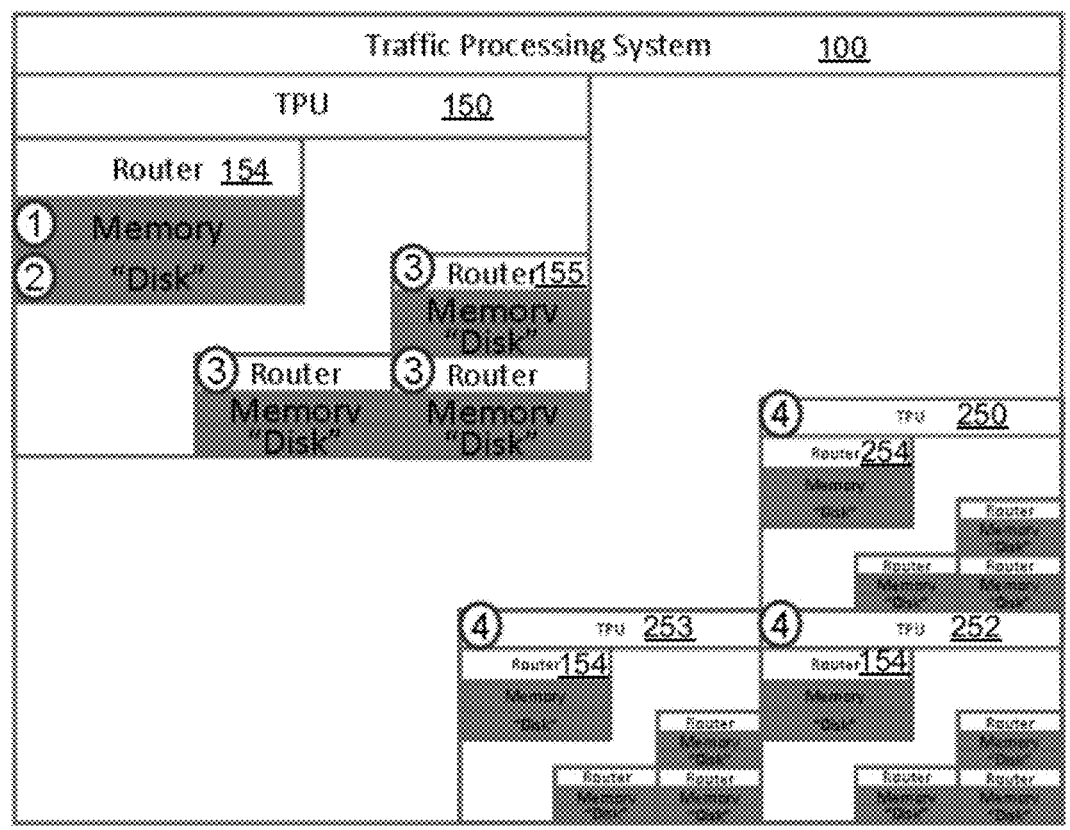
FIG. 14 shows an example of a TPS.
Figure 15:
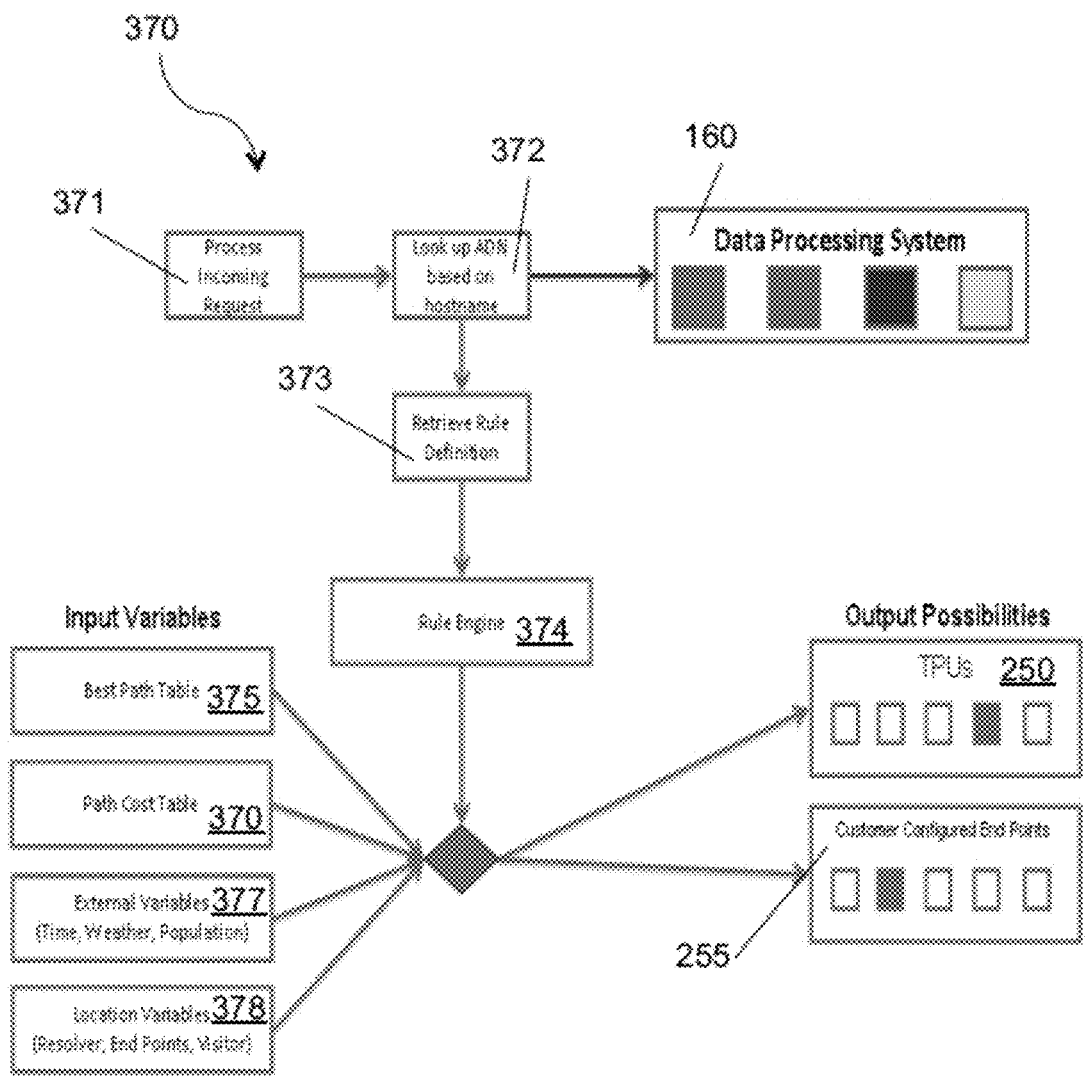
FIG. 15 shows an overview of the load-balancing workflow.

Referring to FIG. 14, TPUs 150, 250, 252, 253 and more directly TPU routers 154, 155 provide customers the ability to "load balance" their traffic across a set of end points also known as origin servers. Referring to FIG. 15, the load-balancing work flow 370 includes the following. TPU 150 receives a client request and processes it (371). Next, it looks up the AND based on the hostname (372), then retrieves the rule definition (373) and sends the request to the rule engine (374). Next, the input variables are selected. Input variables include, the best path table (375), path cost table (370), external values such as time, weather, population (377) and location variables such as resolver, end points, visitor (378). Finally, the output possibilities are determined. The output possibilities include other TPUs (250) and other customer configured end points (255)

This process is very similar to the session grooming process. When traffic passes through the TPU, the router decides which origin server will process the visitor's requests. The load-balancing service of the present invention has the following advantages over the session grooming process. It is an active process, meaning that it happens every time a request is made to a TPU. This is different from the session grooming service, which happens when the host name is resolved. It doesn't have the time-to-live (ttl) issues that the session grooming service does. DNS requests are cached according to the time-to-live provided in the response, if the DNS resolver honors the ttl. Furthermore, when the TPU is handling traffic it is interacting directly with the visitor's IP address and therefore makes better decisions regarding access ("Known visitor IP Address"). Contrary to that, in the session grooming service the decision is made based on the information of the visitor's DNS resolver, which may not be anywhere near the actual visitor.

Parallel Networking

Figure 17:
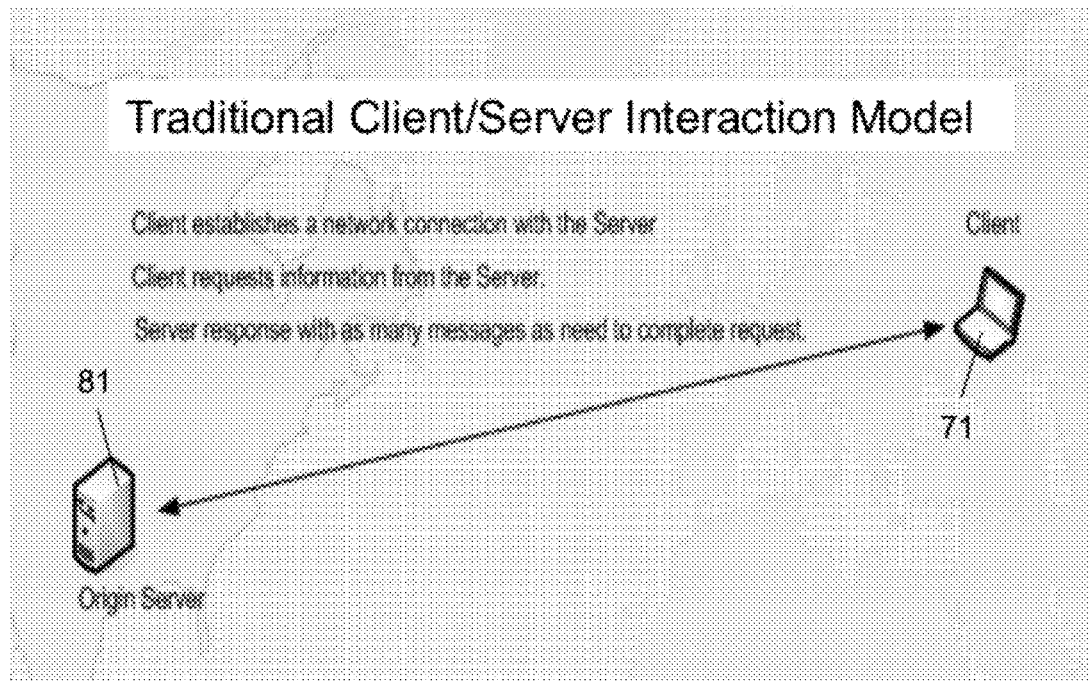
FIG. 17 shows a traditional client/server interaction system.

Parallel Networking refers to the ability to send information to a single node over multiple nodes or channels. Referring to FIG. 17, traditional client/server interactions work on a single node-to-node architecture where the client machine 71 opens up a network connection 72 with the server 81 and all communications between the client and server are sent along that single network connection 72. Network interactions that contain more than one hop repeat the node-to-node single network connection pattern. This model of communication has drawbacks which reduce the throughput of the communication between the client and server based on certain conditions. Listed below are conditions that will result in decreased performance:

1. Send large amounts of data over a TCP connection—TCP provides reliability as one of its benefits, but in order to supply reliability, TCP must periodically send acknowledge-messages and also retransmit loss data.
2. A large latency between client and server—The greater the latency between client and server the longer the time it takes to acknowledge messages as well as resend loss data.
3. Slow network conditions between client and server—When the network conditions between client and server nodes are slow, it will result in a decrease of throughput.
4. Workload of the client machine—When a client becomes too busy to process incoming messages the socket's receiver buffer becomes full and at this point the client drops messages resulting in the need for the messages to be resent.

Figure 16:
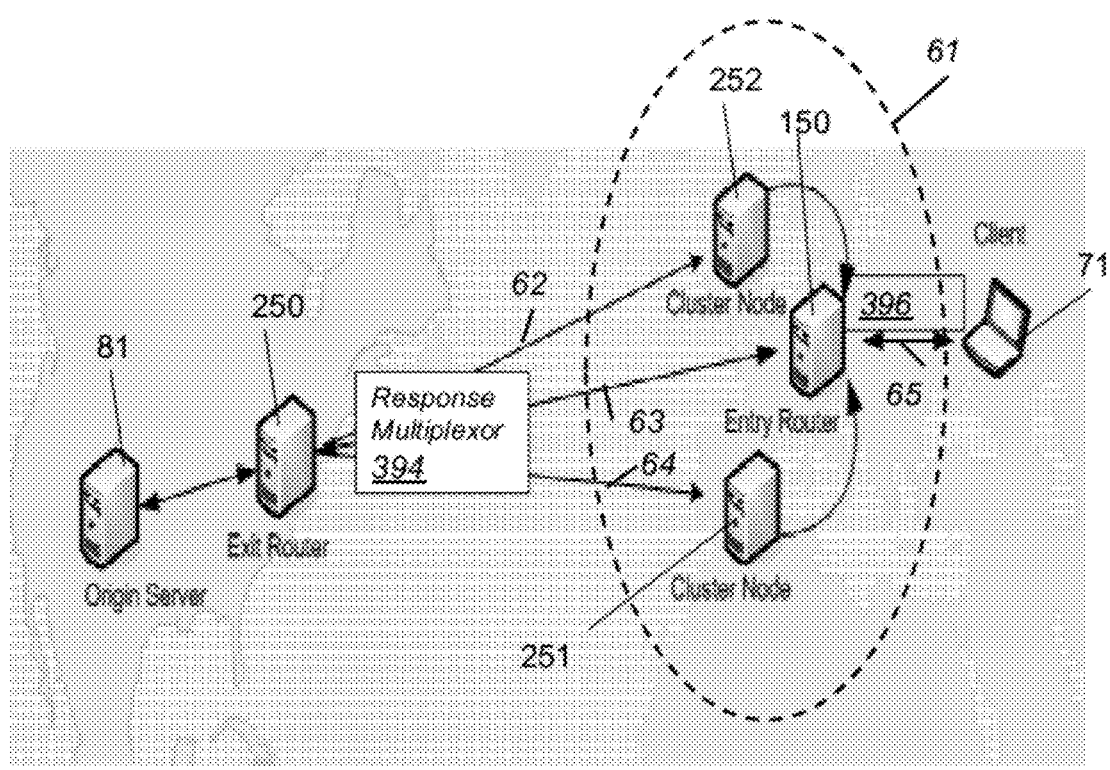
FIG. 16 shows a parallel network system.

The TPS's parallel networking minimizes the impact of traditional networking issues and substantially increases the throughput between two nodes. Referring to FIG. 16 and FIG. 18, the TPS places a set of nodes 150, 251, 252, 250, in the path of the client 71 and server 81 and this set of nodes can implement advanced networking optimization without changing either the client or server. A node within the TPS routing platform can be any machine or process that is designated to handle the TPS's router-to-router traffic or help with facilitating its operation. The TPS's routing platform has multiple nodes that have varying roles, such as timing nodes, request routing nodes, response nodes, or management nodes, among others. As shown in FIG. 16, responses from the exit router 250 are sent to a set of nodes 150, 251, 252, and not just the entry router 150. The set of nodes that are capable of receiving responses is called a "cluster" 61. The function of the cluster nodes is to receive messages from the routing nodes that need to be forwarded to the entry router 150 that originally received the request from the client 71. Each entry router has it's own cluster. The system also includes a response multiplexor 394 that is responsible for taking the responses from the origin server 81 and sending them to nodes 150, 251, 252 within the entry router's 150 cluster table 61. The selection of nodes that belong to a cluster is based on a collection of metrics such as round-trip-time (RTT), geography, network hops between a router and other nodes in the system, among others. Timing nodes within the system calculate the round-trip-times between routers. If the RTT is less than the "cluster-time-tolerance" a node is placed in the router's cluster table. Periodically the RTTs are recalculated to determine if nodes are still suitably placed in the router's cluster table. Timing nodes do not need to be separated from the routers and timing information can come from either specific timing requests or response times of other request/response times.

Nodes in the TPS routing system setup communication channels with each other. Each channel includes multiple transmission control protocol (TCP) and/or user datagram protocol (UDP) socket connections. When a data packet is sent, the channel determines which of the connections within the channel to use based on throughput, availability, network conditions, among others. The TPS nodes communicate with a specific packet format that allows the TPS to add meta-data to both the incoming request from the client and responses from the origin server. Meta-data is added to allow nodes to understand specific node interactions. Examples of meta-data include a router's cluster nodes, packet version, encoding process, clients connection identified, sequence number and other useful information. The TPS's routing system has multiple packet structures that are specifically designed to send different types of data. A "request routing message" structure indicates a message that is sent from one node to another node specifically to process a client's request. A "node management message" structure indicates messages that are sent between nodes that update system level information, including updates to router state changes, time requests, cluster table changes, among others.

As mentioned above, the response multiplexor 394 is responsible for taking responses from the origin server 81 and sending the data to nodes within the entry router's cluster table 61. The entry router's cluster table is sent to the exit router 250 either as part of a "request routing message" or a "node management message". The response multiplexor 394 applies different "cluster node selection algorithms" to choose the appropriate cluster node and socket connection within a channel to send the data to. The cluster node selection techniques include "round-robin", "channel-bursting" and "best node". "Round-robin" refers to sending data to each cluster node in the entry router's cluster table in order. Once all cluster nodes have had data sent to them, the process starts from the beginning of the table and repeats itself. "Channel-bursting" refers to sending "N" pieces of data to a cluster node in the entry router's cluster table, before moving to the next cluster node. Once all the nodes in the cluster table have had data sent to them, the process starts from the beginning of the table and repeats itself "Best node" refers to using meta-data about cluster nodes. The response multiplexor chooses the best node based on the provided meta-data and sends the data to it. In the following, the response multiplexor picks the best node again and again until all the data are sent. Meta-data that can be used to choose the "best node" include throughput, system information, such as memory, CPU, Network Utilization and other information that is helpful for making the decision.

Because the entry router 150 receives messages from multiple sources (cluster nodes 152, 251, 250 and client 71), and over multiple network connections 62, 63, 64, 65, the data are no-longer guaranteed to be in the correct order. A response re-sequencer 396 handles the re-sequencing of the data, placing messages in the correct order before sending them to client 71.

Figure 19:
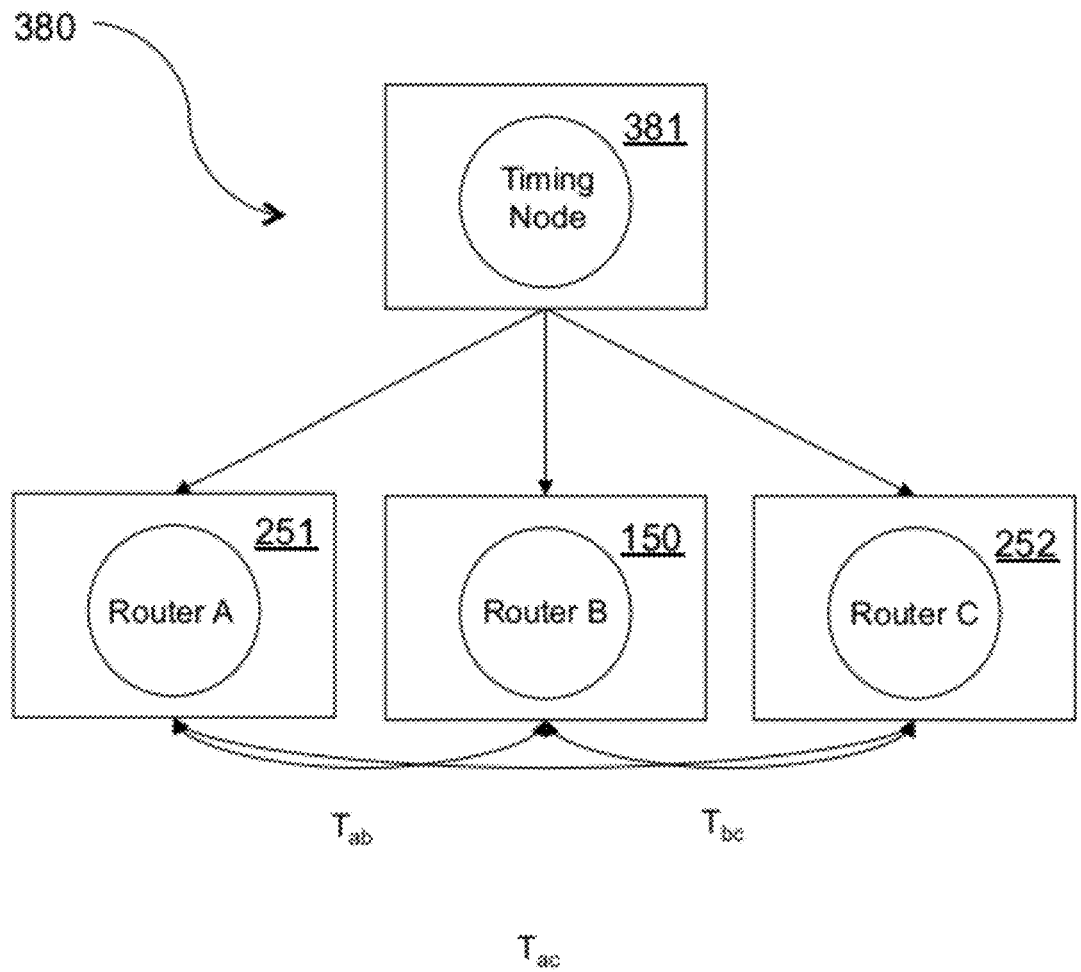
FIG. 19 shows the functionality of a timing node.
Figure 20:
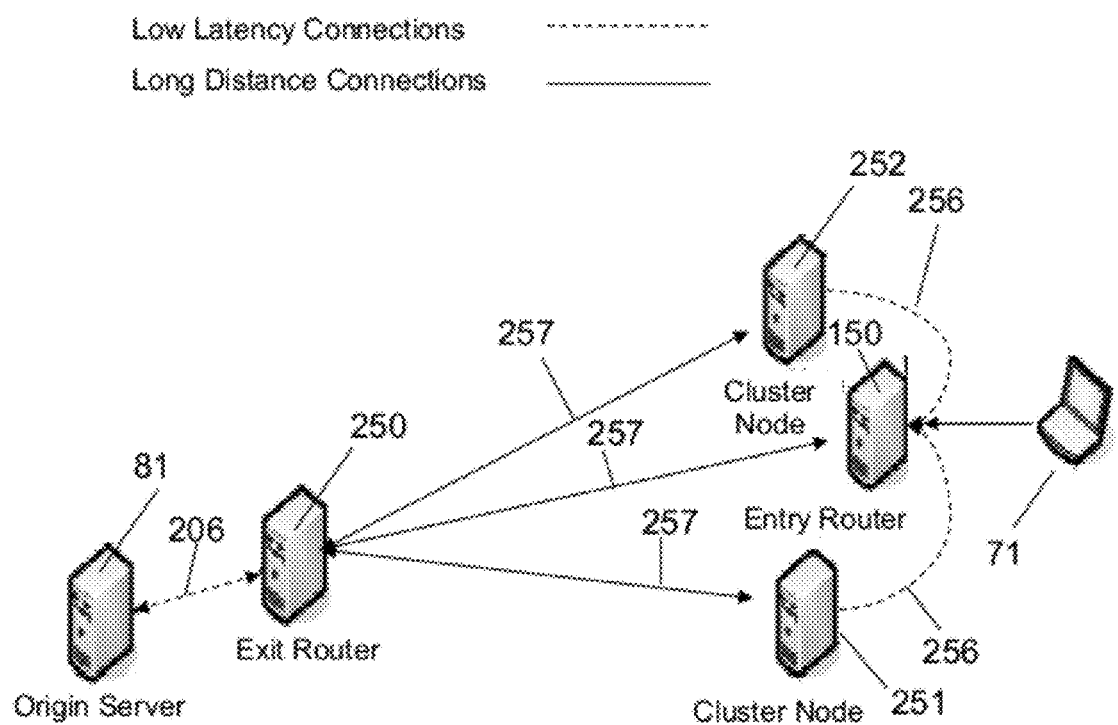
FIG. 20 shows an improved routing system.

End-to-End Parallel Networking Process
System Initialization:

The TPS routing system 100 starts up multiple router nodes 150, 151, 252, 250, which are dispersed geographically so that the latency between possible clients 71 and a router node is minimized, as well as the latency between the origin server 81 and a router node is minimized. Once the router nodes are operational, the TPS's timing system calibrates the latency and network conditions (i.e., number of hops, throughput capacity) between the router nodes, shown in FIG. 19. When the latency and network conditions information is determined, the TPS system creates a single "cluster node metric" that is compared against the "cluster-node-tolerance" value, shown in FIG. 20. Each router node for which the "cluster node metric" is less than the "cluster-node-tolerance" is added to the cluster node table. Periodically the timing system recalculates the "cluster node metric" and adjusts the cluster node table according to the "cluster-node-tolerance".

Request Processing

Figure 21:
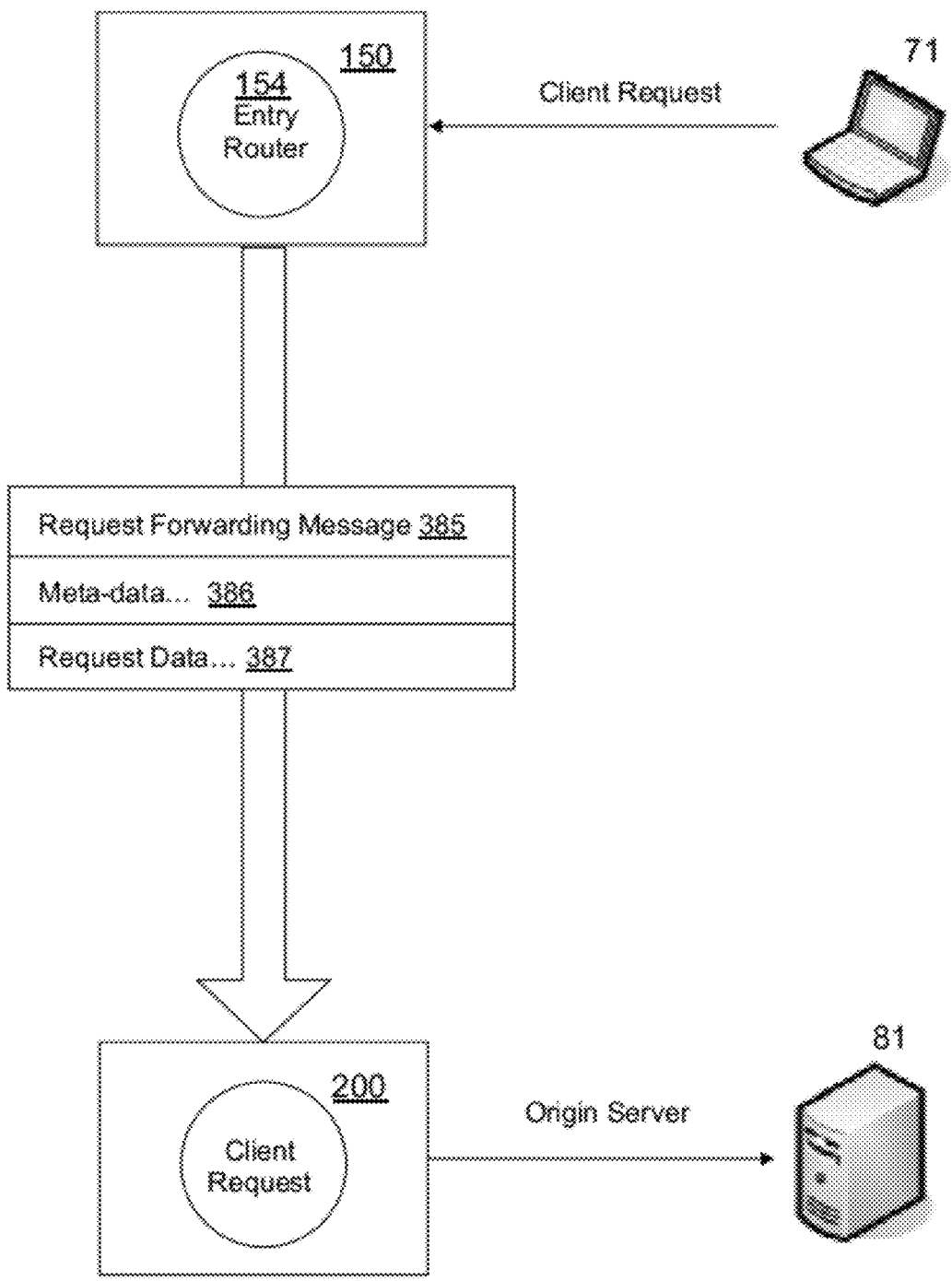
FIG. 21 depicts a flow diagram for a request processing.

Referring to FIG. 21, a client 71 looking to request resources from origin server 81 connects to entry router 150. The connection is made in the same manner as if the client was connecting directly to the origin server 81. In one example, the connection between client 71 and entry router 150 is an HTTP connection. Once, entry router 150 receives a client request, it choose one of the following two processes.

1. Connect to the origin server 81 and execute the request on behalf of the client. When the entry router 150 chooses to connect directly to the origin server 81, parallel networking is not applied.
2. Send a message to a specifically chosen router 250 (exit router) who should execute the request with the origin server 81.

The choice of which exit router to forward the request to is done by calculating which router will be able to execute the request and send all response data to the entry router in the least amount time. This calculation takes into account the entry router to exit router latency, exit router to origin server latency, network conditions, throughput between nodes, system level statistics (i.e., memory, CPU, and network load) and other information that is determined to be helpful in making this decision.

Requests from the client 71 which are forwarded to the exit router 250 are encapsulated into a request forwarding message 385. This message 385 includes the original message from the client along with a client identifier, packet version, cluster table, sequence number, encoding process, and other useful information. When the exit router 250 receives the request forwarding message 385 it stores the meta-data 386 contained in the message so that it can be easily retrieved based on a response from the origin server 81. A network connection then is made to the origin server, if a network connection isn't already currently available. Whenever possible the router 250 reuses network connections to save time. Once the connection is established, the exit router 250 forwards the original message to the origin server 81.

Response Processing

Figure 22:
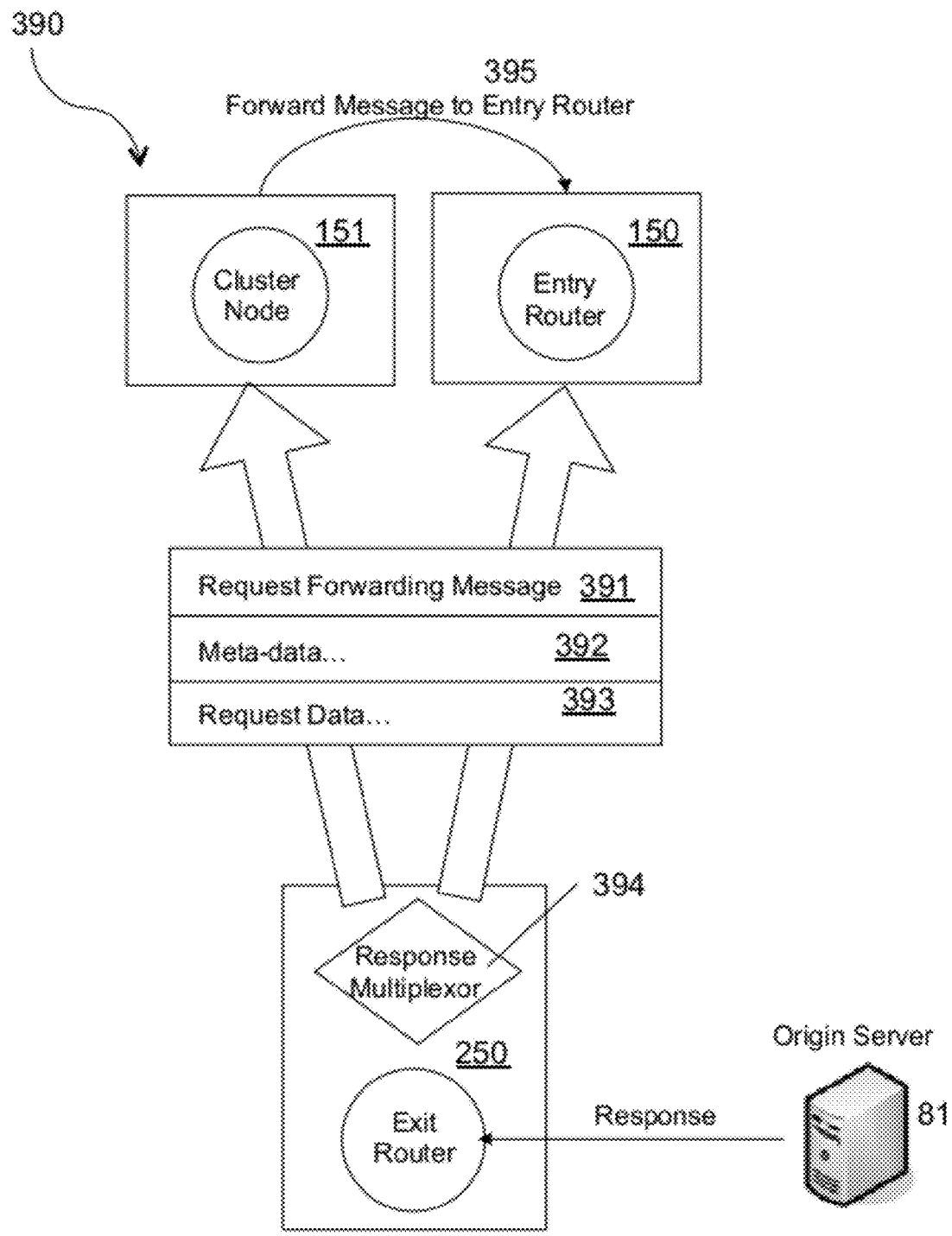
FIG. 22 depicts a flow diagram for a response processing.

Referring to FIG. 22, when the origin server 81 responds to the exit router 250 with data, the exit router 250 processes the data using its response multiplexor 394. Once the response multiplexor 394 receives data from the exit router 250, it retrieves the meta-data 385 contained in the request forwarding request. The entry router's cluster table is used to choose which nodes the response data will be sent to. If no cluster nodes are present, then all data will be sent directly to the entry router 150. The response multiplexor 394 chooses a "cluster node selection algorithm" that can achieve the highest throughput. For every packet of data that is received from the origin server the response multiplexor 394 chooses the best cluster node using the "cluster node selection algorithm". Once the cluster node is chosen, the response multiplexor 394 encapsulates the origin server's response data into a response forwarding message 391 and sends the message to the chosen cluster node. The cluster node's channel may contain more than one socket connection, and therefore the system needs to pick the best suited connection to send the data through.

The response forwarding message 391 contains meta-data 392 to ensure that it can be forward to the entry router 150 that requested the data and that the origin server's response data 393 can be placed into a response packet in correct order. Meta-data 392 that is placed into the response packet include the entry router that requested the data, the client identifier, sequence number, encoding process and other meta-data that is needed to process the response data. Once a cluster node receives a response forwarding message from an exit router 250, it immediately relays the message to the entry router 150 based on the entry router meta-data 392 field in the response forwarding message 391.

Response Re-Sequencer

Figure 23:
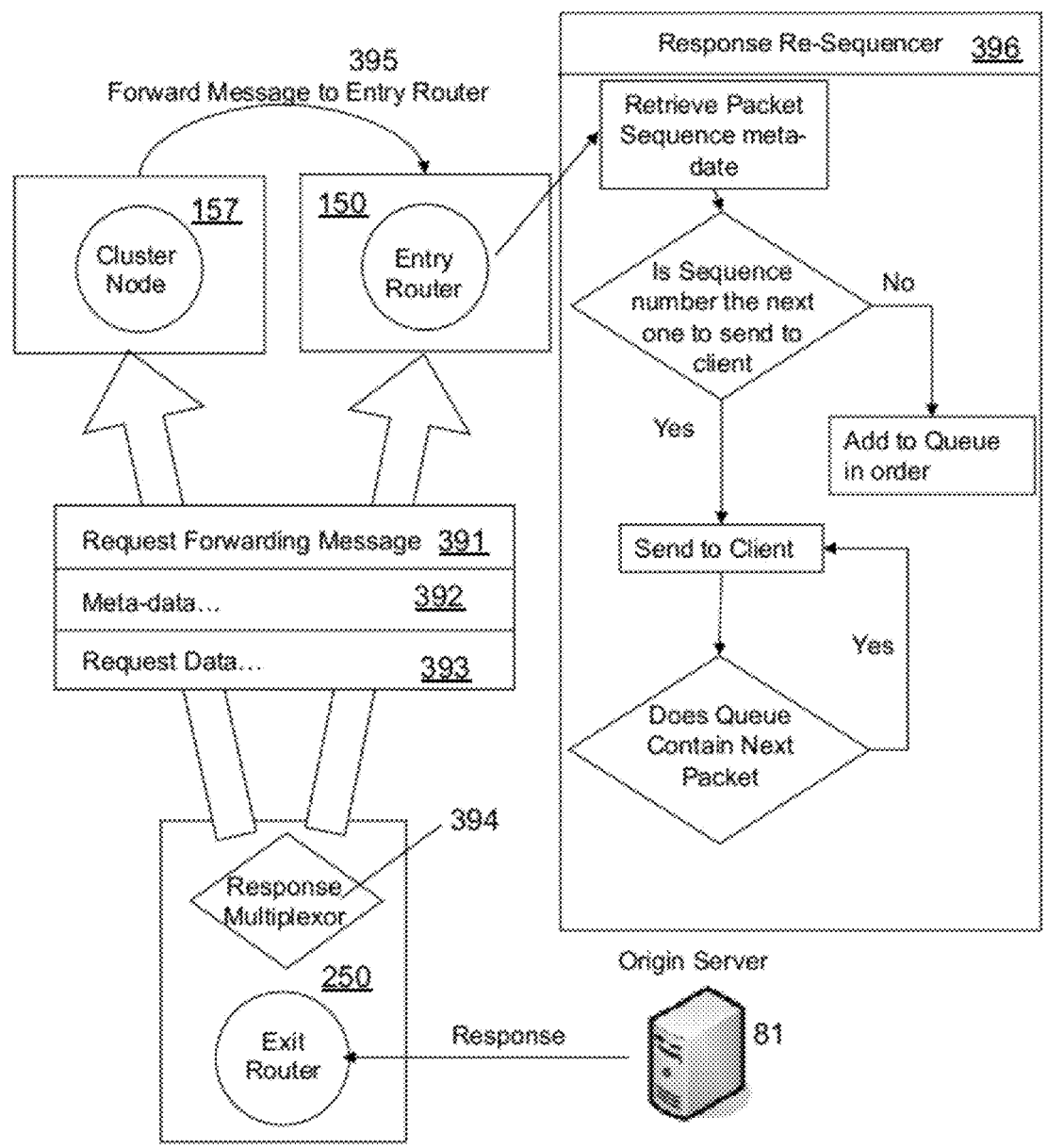
FIG. 23 depicts a flow diagram for a response re-sequencer.

Referring to FIG. 23, response forwarding messages 391 received by the entry router 150 may be received out of order. This is due to the fact that the response messages 391 come from different cluster nodes 157 and from multiple socket connections within a channel. The entry router must ensure that the origin server's response data is placed into the correct sequence before sending it to the client. A response re-sequencer 396 performs this function. Re-sequencing of the data is done by looking at the incoming response forwarding message's sequence number meta-data and checking its sequence number that was last sent to the client. If the sequence number is one more than the last sequence number sent to the client, the origin server's response is immediately sent to the client. If the sequence number is not one more than the last sequence number, it is placed into an ordered queue of messages. The order of the queue is based on the sequence number. After the response forwarding message 391 is received that can be sent to the client, the response re-sequencer 396 looks at the message queue to see if the first message contained in the queue is one more than the last sequence number sent to the client, and if it is that message is sent to the client. This process continues until the all messages are sent.

Several embodiments of the present invention have been described. Nevertheless, it will be understood that various modifications may be made without departing from the spirit and scope of the invention. Accordingly, other embodiments are within the scope of the following claims.

What is claimed is:

1. A system for optimizing the performance of a website that runs on one or more HTTP servers and is configured to receive HTTP requests from one or more clients via user agents and provide HTTP responses to said one or more clients comprising:

an intermediary component configured to connect to said clients and said servers via network connections;

wherein said intermediary component comprises a traffic management system (TMS) and wherein said TMS manages HTTP requests originating from said clients and targeting said servers and HTTP responses targeting said clients and redirects said HTTP requests to said intermediary component; and wherein said intermediary component further comprises a traffic processing system (TPS) and wherein said TPS receives said redirected HTTP requests and said HTTP responses and applies optimization techniques to said redirected HTTP requests and said HTTP responses.

2. The system of claim 1 wherein said optimization techniques comprise:

browser optimization;

content optimization;

HTTP optimization;

network optimization;

content delivery network (CDN) optimization; and infrastructure optimization.

3. The system of claim 1 wherein said intermediary component is cloud based and is configured to run in a private cloud, a public cloud or a hybrid cloud computing infrastructure.

4. The system of claim 3 wherein said cloud based intermediary component runs in different geographic locations around the world.

5. The system of claim 3 wherein said cloud based intermediary component scales its processing capacity by scaling up and down the cloud based computing infrastructure in response to web traffic processing demand.

6. The system of claim 1 wherein said intermediary component further processes said redirected HTTP requests by applying one of fulfilling selected HTTP requests locally, relaying selected HTTP requests to said HTTP servers or relaying selected HTTP request to other HTTP hosts.

7. The system of claim 1 wherein said TMS further directs said optimized HTTP requests to said website and directs said optimized HTTP responses to said users.

8. The system of claim 1 wherein said TMS redirects said HTTP requests and HTTP responses to said intermediary component by adding a Canonical Name (CNAME) to the Domain Name Service (DNS) record of the website and resolving the CNAME to the intermediary component.

9. The system of claim 1 wherein said TMS redirects said HTTP requests and HTTP responses to said intermediary component by hosting the DNS record of the website and resolving DNS requests to the said websites to the intermediary component.

10. The system of claim 1 wherein said TMS redirects said HTTP requests to said intermediary component by providing a network gateway and passing said HTTP requests and HTTP responses through said network gateway.

11. The system of claim 1 wherein said intermediary component comprises a proxy server.

12. The system of claim 1 wherein said intermediary component comprises a library module that runs as part of said one or more HTTP servers that host said website.

13. The system of claim 1 wherein said intermediary component comprises a hardware device or appliance that connects said clients to said one or more HTTP servers.

14. The system of claim 2 wherein said content optimization comprises optimization of HTML pages, optimization of JavaScript files, optimization of CSS files, optimization of image files and optimization of media files and wherein said content optimization reduces the number of HTTP requests required to load the webpage.

15. The system of claim 14 wherein said optimization of HTML pages comprises minification, Gzip, resource bundling, de-duplication, request order shifting, resource inlining and using DataURI technique.

16. The system of claim 14 wherein said optimization of JavaScript files comprises minification, Gzip, JavaScript file bundling, obfuscation, de-duplication, deferred execution, JavaScript inlining and using DataURI technique.

17. The system of claim 14 wherein said optimization of CSS files comprises minification, Gzip, CSS bundling, obfuscation, de-duplication, CSS inlining and using DataURI technique.

18. The system of claim 14 wherein said optimization of image files comprises meta data removal, color table adjustment, right sizing, sprite, compression and using DataURI technique.

19. The system of claim 14 wherein said optimization of media files comprises meta data removal, viewpoint right sizing, transcoding and compression.

20. The system of claim 2 wherein said browser optimization comprises detecting a specific browser and its unique capabilities and rewriting web content to utilize the specific browser's unique capabilities in order to improve browsing experience.

21. The system of claim 2 wherein said browser optimization comprises providing domain sharing in order to enable multiple browser connections.

22. The system of claim 2 wherein said browser optimization comprises using SPDY protocol if the browser supports it, detecting viewport and prioritizing HTTP content that are visible in the viewport, optimizing HTML page layout for a specific browser to improve rendering time and detecting the caching capability of the browser and maximizing client side caching.

23. The system of claim 2 wherein said browser optimization comprises using optimized TCP protocol to communicate with a web browser.

24. The system of claim 2 wherein said browser optimization comprises detecting a web browser as being a mobile web browser and transforming the webpage content to fit into the mobile web browser screen display and rendering.

25. The system of claim 2 wherein said CDN optimization comprises CDN stuffing that optimize website performance by detecting cacheable assets, automatically storing the cacheable assets in selected CDNs, managing these assets and serving them from these CDNs.

26. The system of claim 2 wherein said CDN optimization comprises CDN balancing that optimize website performance by monitoring the performance and cost of various CDNs and serving assets from the best CDN according to a certain measure.

27. The system of claim 2 wherein said HTTP optimization comprises pre-fetching to optimize website performance by analyzing an HTTP response for additional web resources that it requires, requesting such web resources from one said HTTP servers before requests for such resources have been received, and serving such resources upon receiving such requests.

28. The system of claim 2 wherein said HTTP optimization comprises improving webpage loading speed by applying "Gzip" compression to HTTP content and setting "Gzip" header, using HTTP 1.1 when possible to reuse HTTP connections, using SPDY protocol when client-side user agent supports it, using optimized TCP protocol to communicate with client-side user agent, setting proper HTTP caching headers, and offloading HTTPS/SSL processing from said one or more HTTP servers.

29. The system of claim 2 wherein said network optimization comprises improving webpage loading speed by using an optimized network protocol, detecting connection congestion status and selecting less congested connections, optimizing TCP parameters to improving connection handling with a client-side browser as well as said one or more HTTP servers.

30. The system of claim 2 wherein said network optimization comprises using intermediary nodes to communicate relay connections between a client-side web browser and said one or more HTTP servers, wherein the intermediary nodes communicate with said client-side web browser using optimized TCP connections comprising one of 3-way handshake, window size, error handling, packet size, packet count and acknowledgement handling.

31. The system of claim 2 wherein said network optimization comprises using intermediary nodes to relay connections between a client-side web browser and said one or more HTTP servers, wherein the intermediary nodes communicate with said HTTP servers using optimized TCP connections by reusing existing connections, or optimizing TCP parameters comprising one of 3-way handshake, window size, error handling, packet size, packet count and acknowledgement handling.

32. The system of claim 2 wherein said network optimization comprises using multiple intermediary nodes to relay connections between a client-side web browser and said one or more HTTP servers, wherein the intermediary nodes communicate with each other using optimized communication means.

33. The system of claim 32 wherein the optimized communication comprises high speed links.

34. The system of claim 32 wherein the optimized communication means-comprises tuned communication channels.

35. The system of claim 2 wherein said network optimization comprises using multiple intermediary nodes to relay connections between a client-side web browser and said one or more HTTP servers, wherein the intermediary nodes communicate with each other using multiple parallel connections, and split traffic payload among these parallel connections for network transmission.

36. The system of claim 1 further wherein said infrastructure optimization comprises DNS optimization, increasing the number of HTTP server presences, providing server load balancing, providing global load balancing and improving server reachability by adding more data centers or adding more edge presences.

37. A method for optimizing the performance of a website comprising:
providing one or more clients configured to send HTTP requests via web browsers;
providing a website running on one or more HTTP servers and being configured to receive said HTTP requests and provide HTTP responses to said users;
providing an intermediary component;
wherein said intermediary component comprises a traffic management system (TMS) and wherein said TMS manages HTTP requests originating from said clients and targeting said servers and HTTP response targeting said clients and redirects said HTTP request to said intermediary component; and
wherein said intermediary component further comprises a traffic processing system (TPS) and wherein said TPS receives said HTTP requests directed to said website, receives said HTTP responses and applies optimization techniques to said HTTP requests and HTTP responses.

38. The method of claim 37 wherein said optimization techniques comprise:
applying browser optimization;
applying content optimization;
applying HTTP optimization;
applying network optimization;
applying content delivery network (CDN) optimization; and
applying infrastructure optimization.

39. The method of claim 37 wherein said intermediary component is cloud based and is configured to run in a private cloud, a public cloud or a hybrid cloud computing infrastructure.

40. The method of claim 39 wherein said cloud based intermediary component runs in different geographic locations around the world.

41. The method of claim 39 wherein said cloud based intermediary component scales its processing capacity by scaling up and down the cloud based computing infrastructure in response to web traffic processing demand.

42. The method of claim 37 wherein said intermediary component further processes said redirected HTTP requests by applying one of fulfilling selected HTTP requests locally, relaying selected HTTP requests to said HTTP servers or relaying selected HTTP request to other HTTP hosts.

43. The method of claim 37 wherein said TMS further directs said optimized HTTP requests to said website and directs said optimized HTTP responses to said users.

44. The method of claim 37 wherein said TMS redirects said HTTP requests to said intermediary component by adding a Canonical Name (CNAME) to the DNS record of the website and resolving the CNAME to the intermediary component.

45. The method of claim 37 wherein said TMS redirects said HTTP requests to said intermediary component by hosting the DNS record of the website and resolving DNS requests to the said websites to the intermediary component.

46. The method of claim 37 wherein said TMS redirects said HTTP requests to said intermediary component by providing a network gateway and passing said HTTP requests and HTTP responses through said network gateway.

47. The method of claim 37 wherein said intermediary component comprises a proxy server.

48. The method of claim 37 wherein said intermediary component comprises a library module that runs as part of said one or more HTTP servers that host said website.

49. The method of claim 37 wherein said intermediary component comprises a hardware device or appliance that connects said clients to said one or more HTTP servers.

50. The method of claim 38 wherein said content optimization comprises optimization of HTML pages, optimization of JavaScript files, optimization of CSS files, optimization of image files and optimization of media files and wherein said content optimization reduces the number of HTTP requests required to load the webpage.

51. The method of claim 50 wherein said optimization of HTML pages comprises minification, Gzip, resource bundling, de-duplication, request order shifting, resource inlining and using DataURI technique.

52. The method of claim 50 wherein said optimization of JavaScript files comprises minification, Gzip, JavaScript file bundling, obfuscation, de-duplication, deferred execution, JavaScript inlining and using DataURI technique.

53. The method of claim 50 wherein said optimization of CSS files comprises minification, Gzip, CSS bundling, obfuscation, de-duplication, CSS inlining and using DataURI technique.

54. The method of claim 50 wherein said optimization of image files comprises meta data removal, color table adjustment, right sizing, sprite, compression and using DataURI technique.

55. The method of claim 50 wherein said optimization of media files comprises meta data removal, viewpoint right sizing, transcoding and compression.

56. The method of claim 38 wherein said browser optimization comprises detecting a specific browser and its unique capabilities and rewriting web content to utilize the specific browser's unique capabilities in order to improve browsing experience.

57. The method of claim 38 wherein said browser optimization comprises providing domain sharing in order to enable multiple browser connections.

58. The method of claim 38 wherein said browser optimization comprises using SPDY protocol if the browser supports it, detecting viewport and prioritizing HTTP content that are visible in the viewport, optimizing HTML page layout for a specific browser to improve rendering time and detecting the caching capability of the browser and maximizing client side caching.

59. The method of claim 38 wherein said browser optimization comprises using optimized TCP protocol to communicate with a web browser.

60. The method of claim 38 wherein said browser optimization comprises detecting a web browser as being a mobile web browser and transforming the webpage content to fit into the mobile web browser screen display and rendering.

61. The method of claim 38 wherein said CDN optimization comprises CDN stuffing that optimizing website performance by detecting cacheable assets, automatically storing the cacheable assets in selected CDNs, managing these assets and serving them from these CDNs.

62. The method of claim 38 wherein said CDN optimization comprises CDN balancing that optimizes website performance by monitoring the performance and cost of various CDNs and serving assets from the best CDN according to a certain measure.

63. The method of claim 38 wherein said HTTP optimization comprises pre-fetching to optimize website performance by analyzing an HTTP response for additional web resources that it requires, requesting such web resources from one said HTTP servers before requests for such resources have been received, and serving such resources upon receiving such requests.

64. The method of claim 38 wherein said HTTP optimization comprises improving webpage loading speed by applying "Gzip" compression to HTTP content and setting "Gzip" header, using HTTP 1.1 when possible to reuse HTTP connections, using SPDY protocol when client-side user agent supports it, using optimized TCP protocol to communicate with client-side user agent, setting proper HTTP caching headers, and offloading HTTPS/SSL processing from said one or more HTTP servers.

65. The method of claim 38 wherein said network optimization comprises improving webpage loading speed by using an optimized network protocol, detecting connection congestion status and selecting less congested connections, optimizing TCP parameters to improving connection handling with a client-side browser as well as said one or more HTTP servers.

66. The method of claim 38 wherein said network optimization comprises using intermediary nodes to communicate relay connections between a client-side web browser and said one or more HTTP servers, wherein the intermediary nodes communicate with said client-side web browser using optimized TCP connections comprising one of 3-way handshake, window size, error handling, packet size, packet count and acknowledgement handling.

67. The method of claim 38 wherein said network optimization comprises using intermediary nodes to relay connections between a client-side web browser and said one or more HTTP servers, wherein the intermediary nodes communicate with said HTTP servers using optimized TCP connections by reusing existing connections, or optimizing TCP parameters comprising one of 3-way handshake, window size, error handling, packet size, packet count and acknowledgement handling.

68. The method of claim 38 wherein said network optimization comprises using multiple intermediary nodes to relay connections between a client-side web browser and said one or more HTTP servers, wherein the intermediary nodes communicate with each other using optimized communication means.

69. The method of claim 68 wherein the optimized communication comprises high speed links.

70. The method of claim 68 wherein the optimized communication comprises tuned communication channels.

71. The method of claim 38 wherein said network optimization comprises using multiple intermediary nodes to relay connections between a client-side web browser and said one or more HTTP servers, wherein the intermediary nodes communicate with each other using multiple parallel connections, and split traffic payload among these parallel connections for network transmission.

72. The method of claim 37 further wherein said infrastructure optimization comprises DNS optimization, increasing the number of HTTP server presences, providing server load balancing, providing global load balancing and improving server reachability by adding more data centers or adding more edge presences.

73. A method for routing and processing network traffic comprising:
providing first and second parties wherein each party is configured to run on one or more computing devices and is accessible via a first network;
providing a second network comprising a plurality of traffic processing nodes;
redirecting network traffic from said first network to said second network;
redirecting network traffic originating from said first party and being directed to said second party from said first network to a traffic processing node of said second network;
optimizing and processing said redirected network traffic by said traffic processing node; and
routing redirected network traffic that has been optimized and processed by said traffic processing node to said second party via said second network.

74. The method of claim 73 wherein said second network comprises an overlay network superimposed over said first network.

75. The method of claim 73 wherein said first network is the Internet.

76. The method of claim 73 wherein said first party comprises a web browser and said second party comprises a website.

77. The method of claim 73 wherein said second network scales up and down its processing capacity by adjusting its number of traffic processing nodes based on the traffic processing needs.

78. The method of claim 73 wherein said optimizing and processing comprises optimizing said redirected network traffic for faster performance.

79. The method of claim 73 wherein said optimizing and processing comprises optimizing said redirected traffic content to reduce the number of round trips, and to reduce traffic payload.

80. The method of claim 73 wherein said optimizing and processing comprises optimizing network connections between said first party and said traffic processing node.

81. The method of claim 73 wherein said optimizing and processing comprises optimizing network connections between said second party and said traffic processing node.

82. The method of claim 73 wherein said traffic processing node relays said redirected network traffic to one or more additional traffic processing nodes, and said one or more additional traffic processing nodes optimize and deliver said optimized network traffic to said second party.

83. The method of claim 82 wherein said traffic processing nodes use optimized network connections between each other to improve communication performance.

84. The method of claim 82 wherein said traffic processing nodes use parallel networking between each other to improve communication performance, by splitting traffic into multiple packets, delivering said multiple packets over multiple connections in parallel, and re-assembling said multiple packets at a receiving traffic processing node.

85. The system of claim 1 wherein said intermediary component changes its configuration and optimization settings via a user interface, an application programming interface or both.

86. The method of claim 37 wherein said intermediary component changes its configuration and optimization settings via a user interface, an application programming interface or both.

87. A method for optimizing the performance of a webpage comprising:
providing an intermediary component, wherein said intermediary component is configured to connect a web visitor to an origin server, wherein said origin server hosts said webpage;
intercepting said webpage after it is generated from the origin server by said intermediary component;
optimizing the webpage by applying optimization techniques;
rewriting webpage content Uniform Resource Locators (URLs) and distributing the associated webpage content to a globally distributed content store;
delivering the optimized webpage to the web visitor by the intermediary component; and
delivering the associated webpage content from the globally distributed content store.

88. The method of claim 87, wherein said intermediary component comprises one of a network service built into a networking device, a transparent proxy service, an appliance installed in front of the origin server, or a software module running on the origin server.

89. The method of claim 88, wherein said network service comprises a router or switch.

90. The method of claim 88, wherein said intermediary component intercepts the webpage by adding a canonical name (CNAME) to the DNS record of the website and resolving the CNAME to the intermediary component.

91. The method of claim 87, wherein said optimization techniques comprises at least one of optimizing HTML pages, optimizing JavaScript files, optimizing CSS files, optimizing image files or optimizing media files.

92. The method of claim 87, wherein said webpage content comprises at least one of HTML pages, JavaScript files, CSS files, image files, video files, audio files or media file.

93. The method of claim 87, wherein said distributing comprises at least one of pushing content to nodes at different locations, having nodes at different locations pull the content from a central repository, or having nodes at different locations pull the content from the origin server.

94. The method of claim 87, wherein said rewriting webpage content URLs comprises finding a node in the globally distributed content store that is optimal for the web visitor and rewriting the webpage so that the webpage content URLs points to the optimal node before serving the webpage to the web visitor.

95. The method of claim 94, wherein said finding of the optimal node for the web visitor comprises using the web visitor's IP address and finding a node within the distributed content store that has the shortest geographic distance to the web visitor's IP address and/or the lowest network latency to the web visitor's IP address.

96. The method of claim 95, wherein the optimal node is determined via an algorithm that uses information of the web visitor comprising at least one IP address, user agent, or connectivity, information about the website itself comprising at least one of node performance metrics, network performance metrics, availability, bandwidth capacity or delivery cost.

97. The method of claim 87, wherein said rewriting comprises rewriting the webpage so that the webpage content URLs point to specific domain names, and resolving these domain names to the IP addresses of nodes that are optimal for the web visitor at DNS resolution time.

98. The method of claim 87, wherein the globally distributed content store comprises content delivery network (CDN) nodes operated by commercial CDN vendors.

99. The method of claim 87, wherein the optimization techniques comprise at least one of minification, Gzip, resource bundling, de-duplication, request order shifting, resource inlining, dead code removal, JavaScript deferred execution, DataURI, CSS spriting, image right sizing, image color table adjustment, image metadata removal, white space and comment removal, compression, transcoding, or viewport right sizing.

100. The method of claim 87, wherein the intermediary component modifies web content URLs to enable domain sharing.

* * * * *